(12) United States Patent
Missbach

(10) Patent No.: US 9,076,375 B2
(45) Date of Patent: Jul. 7, 2015

(54) BACKPLANE DEVICE FOR A SPATIAL LIGHT MODULATOR AND METHOD FOR OPERATING A BACKPLANE DEVICE

(75) Inventor: Robert Missbach, Kreischa/OT Barenklause (DE)

(73) Assignee: SEEREAL TECHNOLOGIES S.A., Munsbach (LU)

( * ) Notice: Subject to any disclaimer, the term of this patent is extended or adjusted under 35 U.S.C. 154(b) by 442 days.

(21) Appl. No.: 13/635,104

(22) PCT Filed: Mar. 15, 2011

(86) PCT No.: PCT/EP2011/053912
§ 371 (c)(1),
(2), (4) Date: Sep. 14, 2012

(87) PCT Pub. No.: WO2011/113843
PCT Pub. Date: Sep. 22, 2011

(65) Prior Publication Data
US 2013/0002638 A1    Jan. 3, 2013

(30) Foreign Application Priority Data

Mar. 15, 2010   (EP) .................................... 10156572

(51) Int. Cl.
| | |
|---|---|
| *G09G 3/36* | (2006.01) |
| *G09G 3/20* | (2006.01) |
| *G02B 27/22* | (2006.01) |
| *G03H 1/02* | (2006.01) |
| *G03H 1/22* | (2006.01) |

(52) U.S. Cl.
CPC *G09G 3/20* (2013.01); *G02B 27/22* (2013.01); *G03H 1/02* (2013.01); *G03H 1/22* (2013.01);
(Continued)

(58) Field of Classification Search
CPC ........... G02B 27/22; G03H 1/02; G03H 1/22; G03H 1/2294; G03H 2001/0224; G03H 2225/22; G09G 3/20; G09G 3/2085; G09G 2320/0223; G09G 2310/02; G09G 2310/0259
See application file for complete search history.

(56) References Cited

U.S. PATENT DOCUMENTS

| | | | | |
|---|---|---|---|---|
| 8,907,883 | B2 * | 12/2014 | Irie et al. .......................... | 345/96 |
| 2002/0000966 | A1 | 1/2002 | Kudo et al. | |

(Continued)

FOREIGN PATENT DOCUMENTS

| | | |
|---|---|---|
| EP | 1 414 011 A1 | 4/2004 |
| WO | 01/82284 A1 | 11/2001 |

(Continued)

OTHER PUBLICATIONS

International Search Report, dated May 31, 2011, issued in priority International Application No. PCT/EP2011/053912.

*Primary Examiner* — Abbas Abdulselam
(74) *Attorney, Agent, or Firm* — Saul Ewing LLP

(57) ABSTRACT

A backplane device for a spatial light modulator for generating a two-dimensional and/or three-dimensional representation of a scene or of content. The spatial light modulator includes pixels having pixel addresses and being electronically controllable by the backplane device for assigning pixel values to the pixels. The backplane device comprises at least one electrode for each pixel, at least one analog line and at least one pixel addressing means. Such a pixel addressing means comprises x-addressing lines and y-addressing lines. Every pixel is connected to an analog line, to an x-addressing line and to a y-addressing line. As a pixel value assigning scheme a generating means is adapted to generate a voltage characteristic to be applied to the at least one analog line such that the voltage characteristic depends on the pixel values to be assigned to the pixels.

30 Claims, 21 Drawing Sheets

(52) U.S. Cl.
CPC ...... *G03H 1/2294* (2013.01); *G03H 2001/0224* (2013.01); *G03H 2225/22* (2013.01); G09G 3/2085 (2013.01); *G09G 2310/02* (2013.01); *G09G 2310/0259* (2013.01); *G09G 2320/0223* (2013.01)

(56) References Cited

U.S. PATENT DOCUMENTS

| | | |
|---|---|---|
| 2010/0309179 A1 | 12/2010 | Missbach |
| 2011/0261095 A1 | 10/2011 | Missbach |

FOREIGN PATENT DOCUMENTS

| | | |
|---|---|---|
| WO | 2006/066919 A1 | 6/2006 |
| WO | 2008/138983 A2 | 11/2008 |
| WO | 2008/138984 A2 | 11/2008 |
| WO | 2008/138985 A2 | 11/2008 |
| WO | 2008/138986 A2 | 11/2008 |
| WO | 2009/024523 A1 | 2/2009 |
| WO | 2009/092717 A1 | 7/2009 |
| WO | 2010/149587 A2 | 12/2010 |

\* cited by examiner

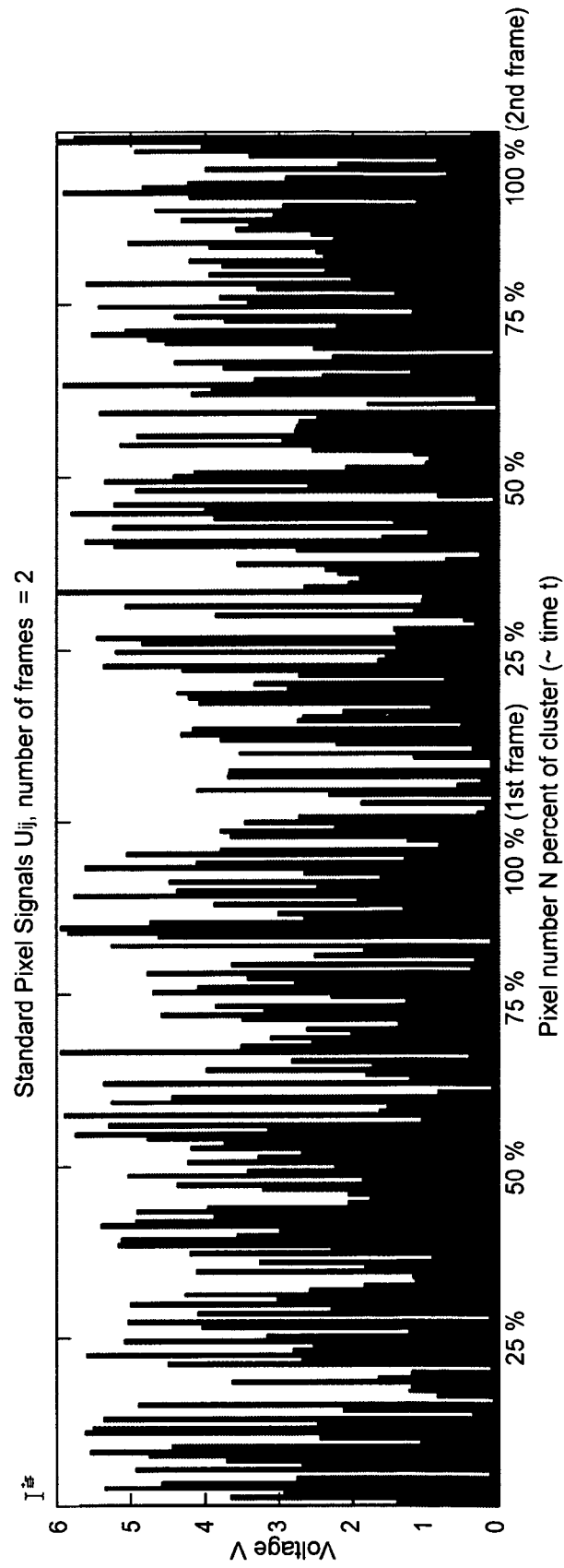

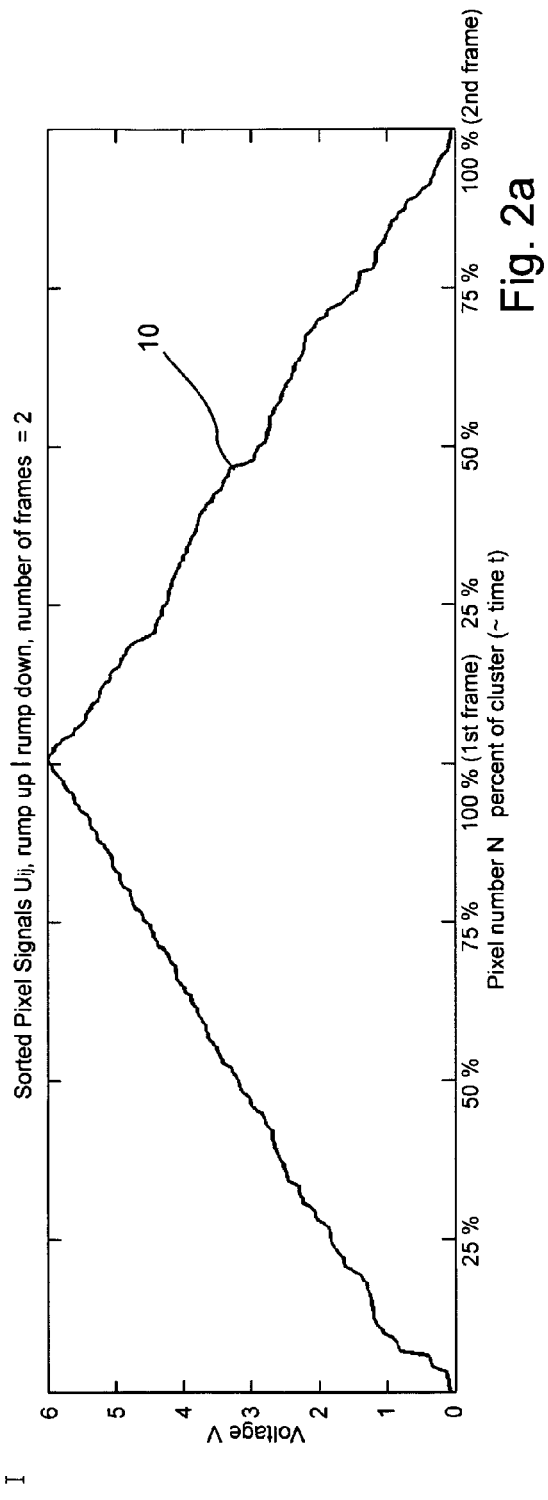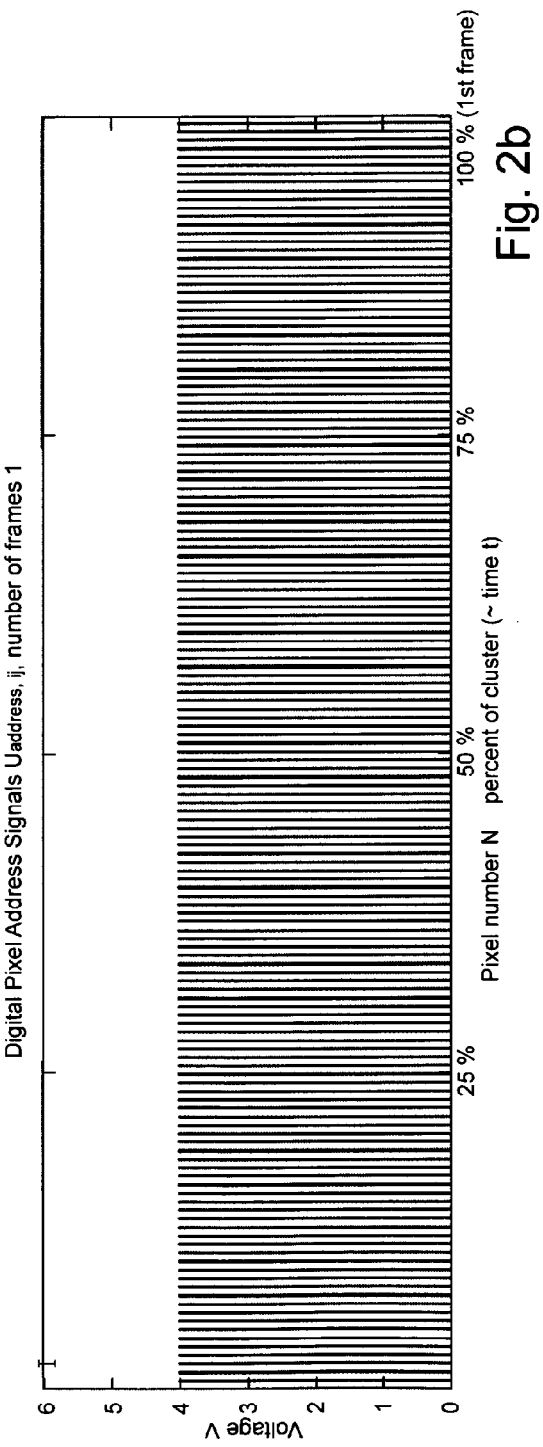

Local wireing: Addv. + Local AM

≥ 2 TFTs / pixel regular wireing

Local wireing: Tree structure

> 2 TFTs / pixel complicated wiring

Pixel circuit:

BACKPLANE DEVICE FOR A SPATIAL LIGHT MODULATOR AND METHOD FOR OPERATING A BACKPLANE DEVICE

CROSS REFERENCE TO RELATED APPLICATIONS

This application claims the priority of PCT/EP2011053912, filed on Mar. 15, 2011, which claims priority to European Application No. 10156572.9, filed Mar. 15, 2010, the entire contents of all of which are hereby incorporated in total by reference.

BACKGROUND OF THE INVENTION

The present invention relates to a backplane device for a spatial light modulator and a method for operating a backplane device.

The spatial light modulator is in particular designed to be used in a display device in the form of a high-resolution display which is used for displaying information. The field of application of the invention includes high-resolution displays, in particular TFT (thin film transistor) displays and LCOS (liquid crystal on silicon) which are used for purposes where the pixels are required to be controlled very quickly. Another field of application are optical elements with a spatial light modulator, said elements affecting the direction or shape of a beam of light or the shape of a coherent wave front.

FIG. 26 shows an example of an active matrix (AM) structure of a backplane device according to the prior art comprising four pixel electrodes 11-1, 11-2, 11-3 and 11-4. The gate lines are activated one after the other, to write the pixels of the whole display. However, this type of addressing using global row and column lines as used in conventional display devices proves to be inadequate in conjunction with increasing resolutions and refresh rates as they are required for example for the representation of holograms in holographic displays.

Increasing the frequency on the column lines means that the whole data line must be recharged against the data line resistance and capacity during each clock cycle, see e.g. FIG. 28. This leads to high output driving currents and to high power dissipation. Additionally, the large impedance of a line will be further increased by the gate capacities of all TFTs connected to this line.

The capacitance of the column lines and the gates of all pixel TFTs must be subjected to charge reversals in much shorter intervals. As a consequence, the power loss increases as the frequency rises. There is a limit defined by the impedance and capacitance of the conductor beyond which it is no longer possible to achieve a full charge reversal in the conductor in one clock cycle.

As a result, active-matrix structures used in nearly all today's LCD (Liquid Crystal device) backplane devices are not able to drive high-resolution displays (e.g. 16000 pixels× 8000 pixels) at fast frame rates, e.g. in the range of 1000 Hz and more. Displays like that are needed especially for holographic display applications, e.g. like they are disclosed in WO 2006/066919 A1, which is incorporated by reference herewith. The reason why such a high frame rate is needed is especially because virtual observer windows (VOW) might have to be generated in a time sequential manner for one or more observers.

Additionally, the large impedance of a line will be further increased by all the connected TFT gate capacities. The combination of both characteristics limits the maximum data line frequency. As a result, using conventional an active matrix design for high-resolution displays with high frame rates seems to be not feasible.

WO 2009/092717 A1 describes a method to overcome some of the AM problems by tiling the display into small clusters and drive these clusters independently from the outside using analog shift registers. Tiling the display into clusters and using very few but fast point to point connections from the outside drivers to the cluster circuit allow very high resolution and very fast displays. But all these kind of displays assign the pixel value to the pixels line by line sorted by display position. This requires the high voltage analog datalines or line segments of the shift registers to be recharged at high frequencies, if the pixel value changes from line to line.

This is especially disadvantageous for holographic displays with usually uniformly distributed pixel values over the spatial light modulator. So with these prior art kind of displays a holographic display normally has the same power dissipation as a normal LC display to which the worst case chessboard test pattern pixel values is assigned to the pixels.

Specially developed backplane structures using pixel clusters and analog shift registers—as disclosed e.g. in WO 2009/024523 A1 or in WO 2009/092717 A1—might be difficult to implement with today's LTPS (Low Temperature Polycristalin Silicon) TFTs, because the inhomogenities of the LTPS complicate the implementation of the analog circuits needed for the analog shift registers.

SUMMARY OF THE INVENTION

It is therefore an object of the present invention to provide a backplane device for a spatial light modulator which can be operated very fast or at a high frame rate, e.g. 300 Hz and more, especially 300 Hz up to 1800 Hz or more, and in particular for high-resolution displays.

The above mentioned problem is solved by the present invention as defined by the features of claim 1 by a backplane device for a spatial light modulator. Such a spatial light modulator is applied especially in a display device for generating a two-dimensional and/or three-dimensional representation of a scene or of content. The spatial light modulator comprises pixels having pixel addresses and being electronically controllable by the backplane device for assigning pixel values to the pixels. The backplane device comprises at least one electrode for each pixel, at least one analog line and at least one pixel addressing means. Such a pixel addressing means comprises x-addressing lines and y-addressing lines. Every pixel is connected to an analog line, to an x-addressing line and to a y-addressing line. As a pixel value assigning scheme a generating means is adapted to generate a voltage characteristic to be applied to the at least one analog line such that the voltage characteristic depends on the pixel values to be assigned to the pixels. The backplane device is adapted such that the pixel addresses are determined depending on the generated voltage characteristic as a pixel addressing scheme. The backplane device is further adapted such that the generated voltage characteristic is applied to the at least one analog line for the purpose of assigning the pixels value to the pixels.

Instead of following the pixel addressing scheme of the backplane devices of the prior art, for example active matrix backplanes, wherein the single pixels of the backplane device are addressed subsequently row by row and within an addressed row either simultaneously or pixel by pixel, the present invention uses a completely different pixel addressing scheme. The whole data line or analog line capacity and transistor gate-capacity of all pixels connected to the data line must be recharged across the data line resistance for each clock cycle. This leads to high output driving currents and to high power dissipation. Additionally, the large impedance of a data line will be further increased by all the connected TFTs gate capacities. The combination of both characteristics limits the maximum data line frequency. As a result, using conventional active matrix design for high-resolution displays of over 24 inch driven with frame rates of 360 Hz or more seems not to be feasible.

The pixel addressing scheme according to the present invention is depending on the pixel value to be assigned to the pixels. Thereby this inventive pixel addressing scheme prevents having very high frequencies on the common analog line being used in prior art systems, where—depending on the pixel values to be assigned to the pixels—for example in one pixel the pixel value of a minimal voltage and in the next pixel the maximal voltage has to be assigned to within two clock cycles. According to the present invention, it is attempted to rather have a voltage characteristic or voltage function being applied to the analog line comprising a lower frequency. This might be achieved by applying for example a ramp up function as the voltage characteristic to the analog line. The single pixels then are addressed depending on the voltage characteristic being applied to the analog line and especially depending on the actual voltage value being applied to the analog line. In other words, a particular pixel is being addressed at the time when the voltage value of the voltage characteristic corresponding to the pixel value to be assigned to this particular pixel is applied on the analog line. Therefore, a high frequency voltage characteristic (at least with respect of the pixel clock range) being applied to the analog line can be prevented and a rather smooth or lower frequency voltage characteristic is applied to the analog line. In order to do that, it is necessary to make the addressing of the pixels in dependence of the voltage characteristic being applied to the analog line. This most likely will result in high frequency signals being applied to the x-addressing lines and to the y-addressing lines. However, this then relates to the digital addressing circuits—not the analog line circuit where higher voltages can be applied—where digital signals of the same (low) voltages are applied.

In state of the art displays slow digital signals charge the low capacities of transistor gates whereas high frequency analog signals drive the large capacities of the pixel electrodes according to the addressing schemes of the prior art. The present invention exchanges this by applying high frequency signals to the small gate capacities of the pixel circuits with the addressing scheme of the pixel circuits of the present invention and relatively slow analog signals to the large capacities of the pixel electrodes. In other words, low charges are transferred at high frequencies on the addressing lines with the addressing scheme of the present invention rather than high or higher charges being transferred on the analog line according to the addressing schemes of the prior art.

For high resolution displays, it is helpful to have smaller transistor and line structure sizes to have a high the pixel aperture. This will reduce possible drive currents. Contrary to this, state of the art displays need higher currents to achieve faster transfer times to keep the frame rate despite the increased number of lines. Reducing the transistor structure size also reduces the transistor gate capacity and the threshold voltage. The present invention profits from smaller structure sizes, because the smaller gate capacities allow higher transistor switching frequencies, lower voltage levels and lower currents. The lower voltages and lower currents result in a reduced power dissipation compared to state of the art implementations.

In a preferred embodiment, the backplane device or the spatial light modulator comprises a counter electrode to the pixel electrodes of the backplane device. The analog line is connected to ground. The counter electrode—instead the analog line—is applied with the generated voltage characteristic while the pixel addressing scheme according to the invention is applied. Usually, the ground connection or ground line is typically needed on the backplane device anyway for e.g. the address decoder circuits or the storage capacitor connected to the pixel electrode. The Liquid Crystal layer is enclosed by two glass substrates. One glass substrate comprises the backplane device having the TFTs and the wiring on it. The other glass substrate comprises the common electrode (also called counter electrode), in most instances being a planar conductive and transparent ITO (Indium Tin Oxide) layer on the glass substrate. The pixel electrode is one contact or part of the pixel capacitor. The common electrode forms the other contact or part for all pixel capacitors. If according to this embodiment the generated voltage characteristic is applied on the common electrode, this influences the pixel electrodes of all pixels of the backplane device. In case the backplane device comprises clusters—to be explained below—then this influences all clusters in the same way. In case the clusters have different distributions of the pixel values, delay cycles might have to be added into the addressing scheme, to be able to use the same ramp function for all clusters. But since holographic displays regularly comprise nearly uniformly distributed pixel values, very few delay cycles might have to be added.

Very efficient charge recycling is possible to further reduce the power dissipation. The high frequency digital signals only drive very small gate capacities. If the difference between old and new pixel voltages is evaluated, clever sorting of the addressed pixel can be used to transfer charges from one pixel to another pixel or to raise or to lower the value of the analog line without external driving. If the transfer can be activated and deactivated at independent times the charge recycling can be even more effective. This is for instance mentioned in section 2.1. of the Appendix.

The driving scheme with enable and disable operations allows to set the time to charge the pixel capacity over the analog line, to large proportions of the frame time. This allows to use low currents to charge the high pixel capacities using relatively long transfer times. Because of the low frequencies on the analog line the analog signal is already steadily applied on the source of the transfer transistor of a selected pixel at the moment the transfer transistor switches and store the pixel value in the pixel. This allows much more precise control of the voltage on the pixel electrode leading to higher gray scale resolution (bit depth), especially for high pixel frequencies.

In general, the proposed invention will mainly profit from smaller structure sizes whereas state of the art solutions will suffer performance penalties.

The value sorted approach according to the present invention is able to access only one or very few pixels per clock cycle. So the number of pixels for the matrix is limited by the required frame time and the achievable access time for one pixel. Because only one or very few pixels are addressed at the same time, the number of pixels for one cluster is limited. But with integrated address decoders, the number of connections from the outside to the cluster is very low and allow to stitch a large number of fast but low resolution clusters to a fast and high resolution display.

Other prior art display devices use pixel circuits similar to the 3TFT pixel circuit described in e.g. FIG. 7 with an analog ramp-line and x and y address lines to use the pixel as digital to analog converter. But in contrast to this invention, the pixels are addressed line by line with one fixed pattern ramp-up/down cycle per line and not per frame.

The value a pixel represents/corresponds to the actual voltage value being applied on the at least one analog line when this pixel is addressed, such that the address of the pixels to which charge is transferred to the single pixels is sorted by the voltage value currently being applied to the analog line.

The term "voltage characteristic" in the sense of the present invention is to be understood as a voltage function which might comprise a constant value for a certain period of time but which also is variable for a certain period of time.

The term "assigning a pixel value to a pixel" with regard to the present invention it is especially to be understood that a voltage is applied to the electrode of the pixel, resulting in a charge transfer to the electrode of the pixel or from the electrode of the pixel in most instances. Such a pixel value causes the spatial light modulator to represent for example a brightness value or a colour value, depending on the kind of spatial light modulator to be operated by the backplane according to the invention.

The voltage characteristic might be a voltage ramp up function or a voltage ramp down function. Preferably a combination of both is applied, i.e. a voltage ramp up function is applied which is followed by a voltage ramp down function. Alternatively or additionally a saw-tooth like function can be applied. Such a saw tooth like function can comprise a steep rising edge and a slowly decreasing characteristic or a slowly increasing characteristic followed by a steep falling edge or a slowly increasing characteristic followed by a slowly decreasing characteristic. The voltage characteristic preferably comprises an overdrive value for a predetermined period of time. Alternatively or additionally, the voltage characteristic preferably comprises an underdrive value for a predetermined period of time. Such an overdrive or underdrive value can be applied in combination with the other voltage characteristics mentioned above, especially whenever it is appropriate.

Usually, the voltage characteristic is variable in time and has predominantly the characteristic of a mathematically monotonic function or series. This does not mean that the voltage characteristic might not comprise single steep rising or falling edges. However, after the occurrence of a single steep rising or falling edge, the subsequent voltage characteristic usually has predominantly the characteristic of a mathematically monotonic function or series. In particular, the voltage characteristic might be monotonic increasing or monotonic decreasing.

According to particular preferred embodiment of the present invention, the generated voltage characteristic being applied to the at least one analog line determines the order of addressing of the pixels. If, for example, the generated voltage characteristic being applied to the at least one analog line comprises a ramp up function starting with low voltage values and increasing to high voltage values, then the pixels to which a low voltage value needs to be applied (because the pixel value to be assigned to this pixel corresponds to the low voltage value) will be addressed first. When the voltage value of the ramp up function is increased to another voltage value, wherein this other voltage value represents the next increased pixel value to be assigned to one or more pixels, then this one or these more pixels are addressed, such that this next voltage value is assigned to the one or to these more pixels. Even though there is no particular order of addressing pixels when the same voltage value is applied to a plurality of pixels, according to this embodiment of the invention there is an order of the addressing of the pixels with respect to different voltage values and therefore pixel values to be assigned to the pixels.

In one preferred embodiment of the invention, the pixel addresses being determined are generated for the x-direction and for the y-direction. The assignment of a pixel value to a pixel is carried out in a random access manner with respect to the x-direction and to the y-direction. This might especially be the case, if the voltage characteristic is not determined depending on the pixel values to be assigned to the pixels and therefore the voltage characteristic might be a generated periodic function, e.g. a sin-function or a ramp up and/or a ramp down function comprising a straight linear increasing/decreasing characteristic. Therefore, there is not by definition a particular order of addressing the pixels, i.e. like in the prior art, where subsequently each row of the backplane is addressed. Even though, this might be the case according to the addressing scheme of the present invention in a particular situation, for instance when adjacent rows of pixels should be assigned to slightly increasing pixel values and within a row, the pixel value is constant, this is not in general the case. In contrast to the prior art addressing scheme, the addressing scheme and therefore the assignment of a pixel value to a pixel according to this embodiment of the present invention might be carried out in a random access manner. Therefore, there is no fixed row cycle or even frame cycle applied because of the random access manner of addressing the pixels.

Preferably, the addressing of all pixels to which the same pixel value is assigned is performed in temporal proximity to each other in one operation mode of the backplane device. This can particularly be applied, if the voltage characteristic comprises a ramp up and/or a ramp down function, as explained above. In another preferred operation mode of the backplane device, the addressing of all pixels to which the same pixel value is assigned is performed at essentially the same time. Such an operation mode of the backplane device could be applied, if a lot of or all pixels have to be assigned to the same pixel value or if the pixel values of a lot of or all pixels have to be reset to a predetermined pixel value. In still another operation mode of the backplane device, the addressing of all pixels to which the same pixel value is assigned is performed in a period of time. This operation mode of the backplane device could especially be applied, if at a time a pixel value is assigned to only one pixel. Then, in case 5 pixels need to be assigned the same pixel value, this operation takes 5 pixel writing cycles being the period of time, because at a time a pixel value is assigned to only one pixel.

In a particular operation mode of the backplane, at a time a pixel value is assigned to only one pixel. In this operation mode, all pixels are assigned once after another in a sequential manner.

In a preferred embodiment of the invention, the spatial light modulator and/or the backplane device comprises a cluster arrangement of at least two clusters of pixels. Each cluster comprises an analog line and a pixel addressing means for addressing the pixels of the cluster. The analog line of each cluster is connected between the cluster itself and an external voltage source, e.g. of a driver means of the backplane device. Preferably, the clusters are controlled independently from each other. Therefore, the pixel values for a particular cluster are assigned to the pixels of this particular cluster by the addressing means and the analog line of this particular cluster, while pixel values for another cluster are assigned to the pixels of this other cluster by the addressing means and the analog line of this other cluster independently either at the same time or shifted in time. Cases of suitable clusters for different applications might be of a square shape and might comprise 64×64 pixels, 128×128 pixels, 256×256 pixels or 1024×1024 pixels. The term "cluster" in the sense of the present invention especially means that a plurality of pixels are arranged and therefore form a connected or a contiguous region of the spatial light modulator. Such a region might have a rectangular shape, a square shape or a honeycomb shape. Preferably, a cluster does not extend over a full width or a full length of the spatial light modulator. The number of pixels of a cluster in the x- or in the y-direction does not need to be $2^n$, n being a natural number.

In general, all types of substrates with actively controllable switching elements can be used to implement the backplane device according to the invention. One example is a LCOS (liquid crystal on silicon) display with the substrate made of single-crystal silicon. Other possibilities are substrates with TFTs made of for instance LTPS, a-Si, amorphous oxide TFTs or organic TFTs.

The terms TFT and transistors are interchangeable in the description and claims meaning that all transistors can be made from TFTs and all TFTs can be replaced by other types of transistors or other actively switching elements, made for instance from single-crystal silicon or other semiconductor material.

In the following, different possibilities to carry out the control circuit of a pixel of a backplane device are described. It is noted that usually all pixels of the spatial light modulator or the backplane device comprise the same control circuit, however, it might be possible to have different control circuits for pixels being applied at a spatial light modulator or the backplane device.

In a first embodiment, a control circuit for a pixel comprises two TFTs. The first TFT is connected to the analog line, to an x-addressing line and to the second TFT. The second TFT is connected to the first TFT, to a y-addressing line and to the electrode of the pixel. It is noted that even though the first TFT is connected to the x-addressing line and the second TFT is connected to the y-addressing line, it could also be vice versa, i.e. the first TFT is connected to the y-addressing line and the second TFT is connected to the x-addressing line instead. This is true for the pixels described in the following as well. It might be advantageous to combine two transistors with the gates connected to the x- and y-addressing lines into a dual-gate transistor. In the first embodiment, a dual gate TFT would combine the function of a selection TFT (in this case the first TFT) and the transfer TFT (in this case the second TFT).

In the further embodiments, the TFTs connected to the x- and y-addressing lines are functioning as selection TFTs, selecting, if the transfer TFT is switched on or off by controlling the voltage on the gate of the transfer TFT. The source of the transfer TFT is connected to the analog line and the drain of the transfer TFT is connected to the pixel electrode. If this transistor is switched on, the charges are transferred from the analog line to the pixel electrode. If the transfer transistor is switched off, the currently applied charge is stored on the pixel electrode thus defining the pixel value.

In a second embodiment, a control circuit for a pixel comprises two TFTs. The first TFT is functioning as a selection TFT and is connected to an x-addressing line, to a y-addressing line and to the second TFT. The second TFT is functioning as a transfer TFT and is connected to the first TFT, to the analog line and to the electrode of the pixel. Such a pixel circuit is comparable to a circuit of a DRAM (Dynamic Random Access Memory) storage cell. The charge stored or applied at the gate capacity of the transfer TFT decides either if the transfer TFT is switched on or if the transfer TFT is switched off. The pixel assigning scheme and the pixel addressing scheme of the present invention might be applied to the DRAM technology or FLASH technology, especially for multilevel purposes. In this case, a pixel corresponds to a storage cell and the pixel electrode corresponds to an electrode of the capacitor of the storage cell.

Assigning a pixel value to the pixel corresponds to storing information (a bit or multilevel bits) into the storage cell.

Preferably, the backplane device comprises at least one enable line and every pixel is connected to an enable line. This is the case for the third to the fifth embodiment of pixel circuits being described below.

In a third embodiment, a control circuit for a pixel comprises three TFTs. The first TFT is connected to the enable line, to an x-addressing line and to the second TFT. The second TFT is connected to the first TFT, to a y-addressing line and to the third TFT. The third TFT is connected to the second TFT, to the analog line and to the electrode of the pixel. This pixel circuit is preferred for a spatial light modulator which is applied in a holographic display device, because this circuit can be operated in different ways.

In a fourth embodiment, a control circuit for a pixel comprises three TFTs, wherein two pixels are located adjacent to each other and are addressed by the same y-addressing line. The first TFT of the first pixel is—as an enabling function—connected to the x-addressing line of the second pixel, to the y-addressing line and to the second TFT of the first pixel. The second TFT of the first pixel is connected to the first TFT of the first pixel, to an x-addressing line of the first pixel and to the third TFT of the first pixel. The third TFT of the first pixel is connected to the second TFT of the first pixel, to the analog line and to the electrode of the first pixel. The first TFT of the second pixel is—as an enabling function—connected to the x-addressing line of the first pixel, to the y-addressing line and to the second TFT of the second pixel. The second TFT of the second pixel is connected to the first TFT of the second pixel, to an x-addressing line of the second pixel and to the third TFT of the second pixel. The third TFT of the second pixel is connected to the second TFT of the second pixel, to the analog line and to the electrode of the second pixel. This embodiment does not have to have a separate enable line on the backplane device for the enablement functionality of a pixel. This is achieved by using the x-addressing line of the one pixel as the enable line for the other pixel of the two neighbouring pixels. This can be done, if the logic level of the enable line corresponds to the logic level of the x-addressing lines.

In a fifth embodiment, a control circuit for a pixel comprises three TFTs. Four pixels are located adjacent to each other and are addressed by the same y-addressing line. The first TFT of the first pixel is—as an enabling function—connected to the x-addressing line of the third pixel, to the y-addressing line and to the second TFT of the first pixel. The second TFT of the first pixel is connected to the first TFT of the first pixel, to an x-addressing line of the first pixel and to the third TFT of the first pixel. The third TFT of the first pixel is connected to the second TFT of the first pixel, to the analog line and to the electrode of the first pixel. The first TFT of the second pixel is—as an enabling function—connected to the x-addressing line of the first pixel, to the y-addressing line and to the second TFT of the second pixel. The second TFT of the second pixel is connected to the first TFT of the second pixel, to an x-addressing line of the second pixel and to the third TFT of the second pixel. The third TFT of the second pixel is connected to the second TFT of the second pixel, to the analog line and to the electrode of the second pixel. The first TFT of the third pixel is—as an enabling function— connected to the x-addressing line of the fourth pixel, to the y-addressing line and to the second TFT of the third pixel. The second TFT of the third pixel is connected to the first TFT of the third pixel, to an x-addressing line of the third pixel and to the third TFT of the third pixel. The third TFT of the third pixel is connected to the second TFT of the third pixel, to the analog line and to the electrode of the third pixel. The first TFT of the fourth pixel is—as an enabling function—connected to the x-addressing line of the second pixel, to the y-addressing line and to the second TFT of the fourth pixel. The second TFT of the fourth pixel is connected to the first TFT of the fourth pixel, to an x-addressing line of the fourth pixel and to the third TFT of the fourth pixel. The third TFT of the fourth pixel is connected to the second TFT of the fourth pixel, to the analog line and to the electrode of the fourth pixel. Likewise to the fourth embodiment, this embodiment does not have to have a separate enable line on the backplane device for the enablement functionality of a pixel. This can be achieved, if for one pixel, the x-addressing line of one of the other pixels of the four neighbouring pixels is used as the enable line for this pixel. This can be done, if the logic level of the enable line corresponds to the logic level of the x-addressing lines.

Even though above TFT or transistor elements are mentioned, other circuits and/or other switching elements can be used or applied for the backplane device instead, the other circuits and/or other switching elements actively realising the function of the transfer and selection transistors.

It might be advantageous that the first TFT of a pixel and the second TFT of the same pixel are combined into a dual gate TFT, resulting in a further simplicity of the pixel circuit and saving space. This might be done for the five embodiments mentioned above.

Even though in principle a lot of possibilities do exist for the connection of the gate, source and drain of a TFT, however, in the following, the most preferred ways of connection the TFTs of the five embodiments mentioned above are described. These ways of connection might also be combined with each other.

An x-addressing line or a y-addressing line is connected with the gate of the first TFT of a pixel or to the gate of the second TFT of the pixel or to the gates of the dual gate TFT mentioned above.

An enable line or the x-addressing line serving as an enable line is connected with the source of the first TFT of a pixel. The drain of the first TFT of a pixel is connected to the source of the second TFT of the same pixel.

The analog line is connected to the source of the third TFT of a pixel and the electrode of the same pixel is connected with the drain of the third TFT of the same pixel. The drain of the second TFT of a pixel is connected to the gate of the third TFT of the same pixel.

Preferably, the pixel addressing means comprises at least one x-address decoder and at least one y-address decoder. The x-address decoder is connected to the x-addressing lines and the y-address decoder is connected to the y-addressing lines.

The address decoder comprises logical circuits which perform the enablement of single or all addressing lines. The x-address decoder and/or the y-address decoder could be based on a Dynamic NOR-decoder and/or could be based on a Dynamic NAND-decoder and/or could be based on an OR-decoder and/or could be based on a CMOS-Decoder comprising a NAND and NOR circuit and/or could be based on an AND-decoder.

Depending on the kind of spatial light modulator and the application which is intended to be realized with it, the x-address decoder and/or the y-address decoder could be arranged at various positions on or relative to a backplane device. The x-address decoder and/or the y-address decoder could be arranged separately from the backplane device. Alternatively, the x-address decoder and/or the y-address decoder could be located at the outside edge of the backplane device. A further alternative could be to locate the x-address decoder and/or the y-address decoder on the backplane device between the pixels.

If, for example, all pixels of the backplane device or of one cluster comprise the same kind of pixel circuit, e.g. a three pixel circuit with an enable line, there are various ways of orienting the pixel circuits of the pixels relative to each other. The following possibilities are preferred, wherein each pixel comprises a pixel control structure: the pixel control structures are arranged in a regular layout, which means that all pixel control structures might be oriented in the same way. Alternatively, the pixel control structures of two neighbouring pixels are arranged mirrored to each other. The axis of symmetry for the mirrored arrangement could be in between the two pixels. If the two pixels are neighboured next to each other in x-direction, then the axis of symmetry would be oriented in y-direction. A further alternative is that the pixel control structures of four neighbouring pixels being located next to a common center are arranged mirrored to each other. A first axis of symmetry could be positioned between two pixels and on the common center and a second axis of symmetry could be positioned between two pixels and on the common center and perpendicular to the first axis of symmetry. Such mirrored layouts reduce the effort for providing lines common to all pixels like the analog-line, enable-line or lines need for power or pixel storage capacities.

In a preferred embodiment, the spatial light modulator is adapted to deflect light interacting with the spatial light modulator on the basis of diffraction, wherein the spatial light modulator is preferably realized according to one of the claims of WO 2010/149587 A2. Such a spatial light modulator comprises a controllable liquid crystal molecule layer into which a refraction index distribution corresponding to a diffraction grating structure can be encoded. Light interacting with such a diffraction grating/pattern is diffracted by the spatial light modulator. Preferably, the spatial light modulator is operated such that the diffraction gratings to be encoded into the spatial light modulator comprise a diffraction grid having a variable pitch. Therefore, the deflection angle of the light interacting with the spatial light modulator can be varied. Such a spatial light modulator comprises electrodes being elongated linearly in one direction, the electrodes being located next to each other. Therefore, a pixel of such spatial light modulator is an elongated linear region of the spatial light modulator. For further details of such a spatial light modulator, reference is made to the WO 2010/149587 A2, which is incorporated completely by reference herein.

The above mentioned problem is solved by the present invention as defined by the feature of claim 25 by a method for operating a backplane device for a spatial light modulator. The spatial light modulator comprises pixels having pixel addresses and being electronically controlled by the backplane device for assigning pixel values to the pixels. The backplane device comprises at least one electrode for each pixel, at least one analog line and at least one pixel addressing means. Such a pixel addressing means comprises x-addressing lines and y-addressing lines. Every pixel is connected to an analog line, to an x-addressing line and to a y-addressing line. The method according to the invention comprises the steps of:

as a pixel value assigning scheme a generating means generates a voltage characteristic to be applied to the at least one analog line such that the voltage characteristic depends on the pixel values to be assigned to the pixels, the pixels addresses are determined depending on the generated voltage characteristic as a pixel addressing scheme and the generated voltage characteristic is applied to the at least one analog line for the purpose of assigning the pixel values to the pixels.

The method according to the invention is particularly designed to operate the backplane device according to one of the claims 1 to 24. In the knowledge of the backplane device according to one of the claims 1 to 24, a person skilled in the art is suggested to methods and variations thereof to operate the backplane device according to one of the claims 1 to 24. Therefore, reference is made to the description made above for the sake of preventing repetitions.

In the following, particular operation modes for assigning pixel values to one or more pixels are described. Even though these operation modes are preferred for some applications, there are more operation modes possible or suitable for operating the backplane device and for assigning pixel values to the pixels. The operation modes being described below focus on assigning pixel values to the pixels. However, this description does not describe e.g. details of the addressing means and the operation of addressing decoders, which are suggested by a person skilled in the art when configuring addressing means to achieve a particular addressing scheme.

In order to assign a pixel value to a pixel, in a preferred operation mode, the x-addressing line and the y-addressing line for this pixel are selected or activated and the enable line being connected to this pixel is activated. This results in a charge transfer from the analog line to the electrode of the pixel. The x-addressing line and the y-addressing line are deselected or deactivated and/or the enable line being connected to this pixel is deactivated. This maintains the charge which has been transferred at the electrode of this pixel.

In order to assign the same pixel value to a plurality of pixels, in a further preferred operation mode, for each of these pixels, the enable line being connected to such a pixel is activated and the x-addressing line and the y-addressing line are subsequently selected. This results in a subsequent charge transfer from the analog line to the electrode of each subsequently activated pixel. The x-addressing line, the y-addressing line and the enable line for these pixels are deactivated. This maintains the charge which has been transferred at the electrodes of these pixels.

In still a further preferred operation mode, the assignment of pixel values for a plurality of selected pixels is carried out in the following way: the x-addressing lines and the y-addressing lines are selected. Also, the addressing lines having an enabling function for these pixels are activated. In case the enabeling is carried out via an enable line, the enable line being connected to these pixels is activated. Once this is done, the electrodes of all these selected pixels are set to a same voltage as provided via the analog line. This corresponds to short circuiting all electrodes of the selected pixels. Then the x-addressing lines and the y-addressing lines are deselected. For assigning a pixel value to a particular pixel of the selected pixels, the x-addressing line and the y-addressing line for this pixel are selected. This results in a charge transfer from the analog line to the electrode of the pixel. The x-addressing line and the y-addressing line are deselected. The enable line being connected to these pixels is deactivated for maintaining the charge of the electrodes of these pixels.

In a particular preferred embodiment, a spatial light modulator according to claim 29 comprises a backplane device according to one of the claims 1 to 24. Similarly, in a particular preferred embodiment, a display device according to claim 30 comprises a backplane device according to one of the claims 1 to 24 or comprises the spatial light modulator according to claim 29. These embodiments are especially advantageous for a display device for generating a two-dimensional and/or three-dimensional representation of a scene or of content.

BRIEF DESCRIPTION OF THE DRAWINGS

There are various possibilities for configuring and developing the teaching of the present invention in an advantageous manner. In this respect, reference should be made firstly to the patent claims subordinate to patent claim 1, and secondly to the following explanation of the preferred exemplary embodiments of the invention with reference to the drawing. Generally preferred configurations and developments of the teaching are also explained in conjunction with the explanation of the preferred exemplary embodiments of the invention with reference to the drawing. In the drawing, in each case in a schematic illustration, FIG. 1 shows in a schematic diagram an example of the voltage characteristic of an analog line of a backplane device according to the prior art, using uniformly distributed pixel values appearing in a holographic display application, FIG. 2a shows in a schematic diagram an example of the voltage characteristic of an analog line of a backplane device according to the present invention, FIG. 2b shows, in a schematic diagram, an example of the pixel addressing signals according to the present invention.

DETAILED DESCRIPTION OF THE INVENTION

Figure 3A:
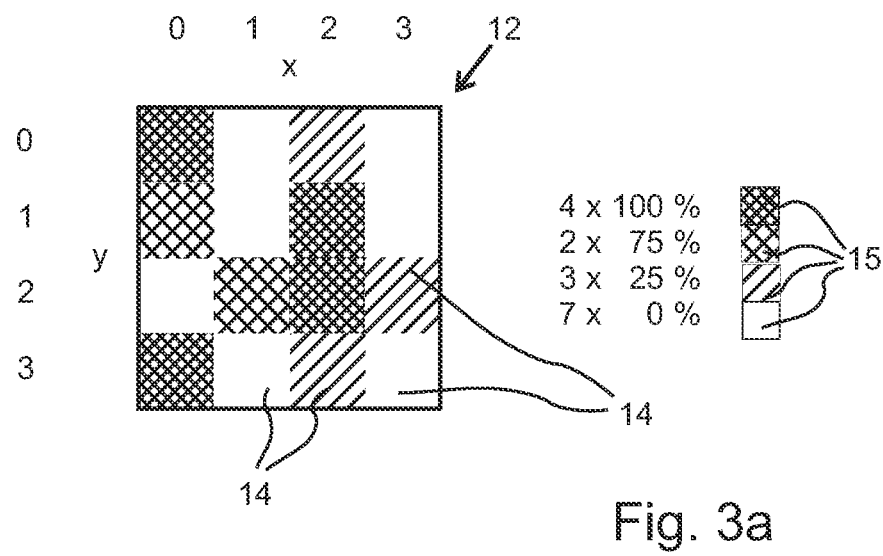
FIG. 3a shows an example of a spatial light modulator comprising 16 pixels to which four different grey values—pixel values—have been assigned.

FIG. 1 shows in a schematic diagram of an example of the voltage characteristic of an analog line of a backplane device according to the prior art.

The voltage V is shown as the function of the pixel number N for the duration of two frames. Because of the addressing scheme of the prior art, wherein the pixels of a spatial light modulator are addressed line by line and within a single line are addressed one after another, different uniformly distributed voltages between the range of 0 V and 6 V are applied on the analog line of the prior art backplane, whenever the next pixel according to the fixed addressing scheme is addressed. This results in driving analog values from the outside of the display area in a very fast manner, leading to the physical limits of the electronics of a backplane device, for example the large line capacities prevent increasing switching frequencies on the continues analog lines. However, the frame rate or refresh rate of the spatial light modulator can be increased according to the particulars of the present invention.

According to the present invention, a pixel value assigning scheme different to the one known from the prior art is used. This can be seen by the schematic diagrams shown in FIG. 2a. The diagram in FIG. 2a shows a voltage characteristic 10 being a voltage function which is applied to the analog line of the backplane device, to which the pixels are connected. This voltage characteristic 10 shown in the diagram comprises the voltage values which are applied to the analog line during two frames. The voltage characteristic 10 comprises the shape of a ramp up function for the first frame and comprises essentially a ramp down function for the second frame. According to this embodiment of the invention, the voltage characteristic 10 has been generated depending on the pixel values which have to be assigned to single pixels of the spatial light modulator by the backplane device. Because the voltage characteristic 10 is almost a function comprising a linear increase for the first frame and almost a linear decrease for the second frame, the pixel values to be assigned to the pixels are rather highly distributed. In other words, no regions comprising the same pixel value appear in the two frames which will be assigned by the voltage characteristic 10 of FIG. 2a, because if, for example ⅓ of all pixels would have the same pixel value, this would result in a region of the voltage characteristic 10 being horizontal or parallel to the abscissa as shown in the diagram of FIG. 2a. The schematic diagram according to FIG. 2b shows the pixel address signals which are applied to the addressing lines of the backplane device for the first frame. As can be seen, in this embodiment, high frequency signals are applied to the addressing lines. However, because these addressing signals are digital signals having the logical value of either 0 or 1, this can be realized electronically at a higher frequency than realizing the high frequency analog voltage values as they are shown for example in FIG. 1.

FIG. 3a shows a part of a spatial light modulator 12 comprising pixels 14. The pixels 14 of the spatial light modulator 12 as shown in FIG. 3a comprise four different pixel values 15 being indicated with different hatching. In the example of FIG. 3a four pixels have been assigned with the maximum pixel value 15 of 100%. Two pixels 14 comprise the pixel value 15 of 75%. Three pixels 14 comprise the pixel value 15 of 25% and the remaining seven pixels comprise the pixel value 15 of 0%. Above the spatial light modulator 12 of FIG. 3a the address numbering of the single pixels in the x-direction is indicated, being from 0 to 3. On the left hand side of the spatial light modulator 12, the address numbering of the single pixels 14 in the y-direction are indicated, being 0 to 3.

Figure 3B:
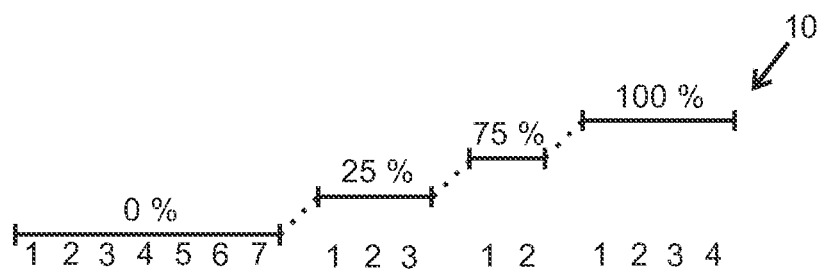
FIG. 3b shows an example of the voltage characteristic to be applied on the analog line to assign the four different grey values to the 16 pixels of the spatial light modulator as shown in FIG. 3a, FIG. 4 shows an example of a backplane device according to the present invention comprising a plurality of clusters, of which only four clusters are shown, FIGS. 5 and 6 each show an example of a pixel circuit of a pixel, wherein such a pixel circuit comprises 2 TFTs.

FIG. 3b shows in a schematic representation the voltage characteristic 10 to be applied on the analog line (not shown in FIG. 3a, 3b) for the pixel value 15 distribution as indicated in FIG. 3a. As it can be seen, the voltage corresponding to the pixel value 15 of 0% is applied to the analog line for a total of 7 pixel addressing cycles. The voltage corresponding to the pixel value 15 of 25% is applied to the analog line for three pixel writing cycles. The voltage corresponding to a pixel value 15 of 75% is applied for two addressing cycles. The voltage corresponding to the pixel value 15 of 100% is assigned for four pixel addressing cycles to complete the assigning of all 16 pixels 14 of the spatial light modulator 12 for one frame as shown in FIG. 3a.

As can be seen from FIGS. 2a and 3b, the voltage characteristic 10 is variable in time and in these examples has predominantly the characteristic a mathematically monotonic function. It is noted, that the voltage characteristic 10 of FIG. 3b is of a continued kind, indicated by the dotted lines between the different voltages indicated by the solid lines.

Starting with the pixel value distribution of the pixels 14 of the spatial light modulator 12 as shown in FIG. 3a, the voltage characteristic 10 as shown in FIG. 3b is generated. In this example, a ramp up function is applied. Therefore, the voltage characteristics 10 starts with the lowest voltage and increases to the highest voltage. Therefore, the voltage characteristic 10 depends on the pixel values 15 to be assigned to the pixels 14. This is to be understood in particular under the term "pixel value assigning scheme". The voltage characteristic 10 is generated by generating means not shown in FIGS. 3a and 3b.

Once the voltage characteristic 10 has generated depending on the pixel values 15 to be assigned to the pixels 14, the pixel addresses of the pixels 14 to be addressed when the voltage characteristic 10 is applied to the analog line is determined. As can be seen, the pixels 14 comprising a pixel value 15 having 0% need to be addressed first. Therefore, the pixels (0,2), (1,0), (1,1), (1,3), (3,0), (3,1) and (3,3) are generated. It is not necessary that the addresses of the pixels 14 having the 0% pixel value 15 are exactly in the order as indicated above. A different order of assigning these pixel values 15 to the pixels 14 could be used as well. Therefore, it is possible that the generated voltage characteristic 10 being applied to the at least one analog line determines the order of addressing of the pixels 14. In this example, the addressing of all pixels 14 to which the same pixel value 15 is assigned is performed in temporal proximity to each other.

Figure 4:
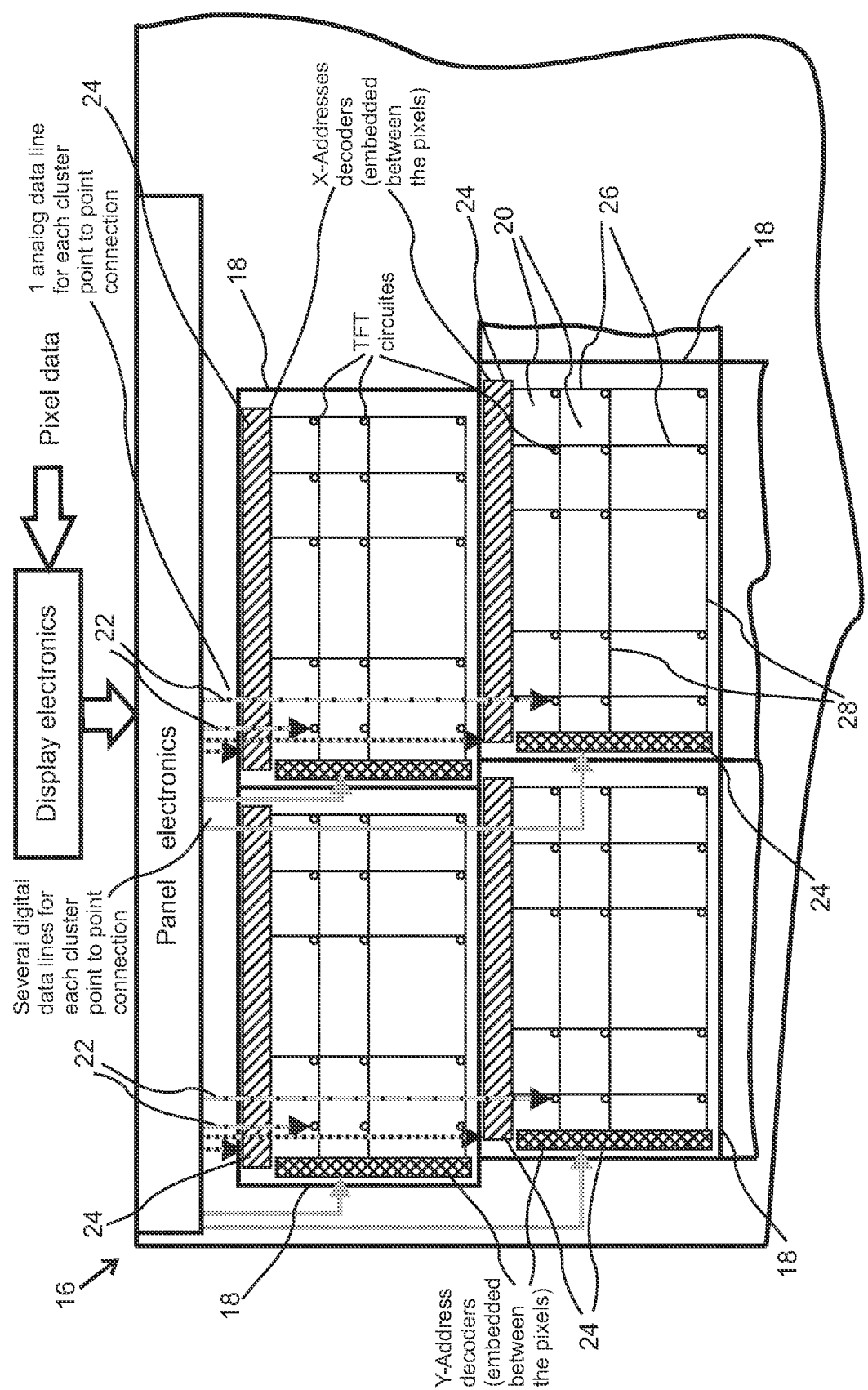

FIG. 4 shows an example of a backplane device 16 comprising a plurality of clusters 18. FIG. 4 does not show the complete backplane device 16, but only a single section of it. Therefore, only four clusters 18 are shown in FIG. 4. Every cluster 18 comprises pixel circuits 20 being indicated schematically with single squares. Every pixel circuit 20 is assigned to pixel of the spatial light modulator 12 (not shown in FIG. 4). According to the embodiment as shown in FIG. 4, the clusters 18 are controlled independently from each other. The pixels and therefore the pixel circuits 20 form a connected and contiguous region of the backplane device 16 as well as of the spatial light modulator to form the cluster 18. The connected regions of this embodiment have a rectangular shape and the clusters 18 do not extent over the full with or over the full length of the backplane device 16 or the spatial light modulator.

Every cluster 18 comprises an analog line 22 as well as pixel addressing means 24 for addressing the pixels or the pixel circuits 20 of the cluster 18. It is schematically indicated in FIG. 4, that pixel data coming for example for a computer are transferred to the display electronics of the display device in which the spatial light modulator and the backplane device 16 is included. The display electronics transfers the pixel values and the addressing values to the panel electronics of the backplane device 16. Depending on the particular configuration of the display device, the voltage characteristic 10 and the pixel address can be generated either in the computer or in the display electronics of the display device or in the panel electronics of the backplane device 16. In FIG. 4 it is indicated, that each cluster 18 comprises a connecting line between the panel electronics and the pixel addressing means 24 for transferring address information to the pixel addressing means 24. It is schematically shown in FIG. 4 that the pixel addressing means 24 is connected and/or comprises x-addressing lines 26. The addressing means 24 for addressing the y-address of a pixel comprises y-addressing lines 28.

Figure 31:
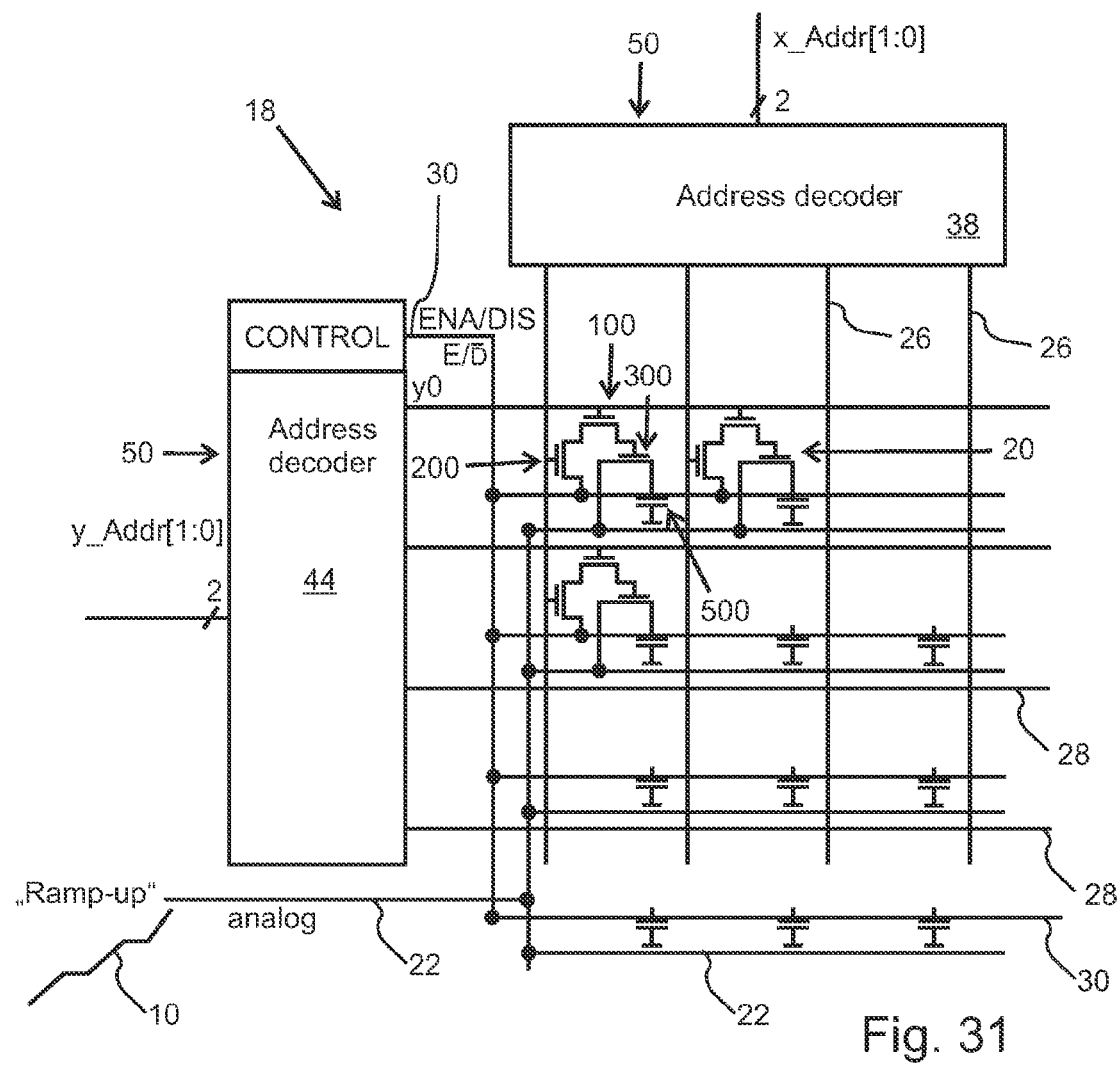
FIG. 31 shows an example of an embodiment of the present invention, where a part of the circuitry of the backplane is shown, especially the circuitry of three pixels comprising 3 TFTs.

FIG. 31 shows in a schematic representation of another example of a small cluster 18. The cluster 18 shown in FIG. 31 comprises only 16 pixels and the pixel circuits 20 therefore (of which only 3 pixel circuits 20 are shown in FIG. 31), only for the sake of explanation. In reality, clusters will have more pixels, but can be operated in the same way. Several cluster designs are possible. They differ in regards to their number of TFT per pixel and to the number and arrangement of the electrical lines. Different cluster designs usually comprise differ features.

Figure 7:
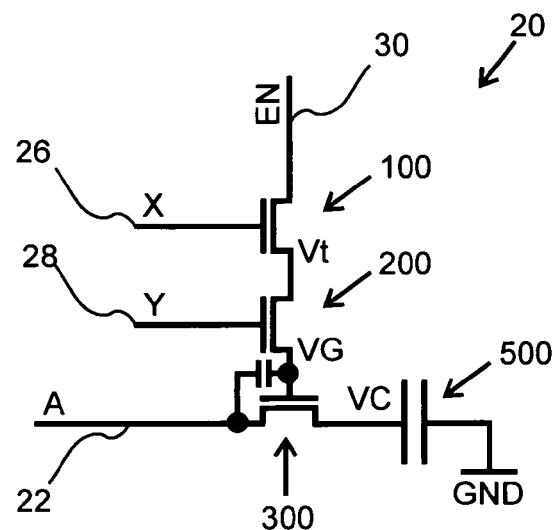
FIG. 7 shows an example of a pixel circuit of a pixel, wherein such a pixel circuit comprises 3 TFTs.

The cluster 18 as shown in FIG. 31 is controlled by an address decoder circuit 50 which comprises an x-address decoder 38 and a y-address decoder 44. The x-address decoder 38 and the y-address decoder 44 receive addresses, e.g. x_Addr[1:0] and y_Addr[1:0], from the panel electronics (not shown). Each single pixel circuit 20 comprises a TFT circuit composed of 2, 3 or more TFTs. In the present example, a 3-TFT variant according to the example of FIG. 7 is chosen, because it offers additional features.

The pixel circuit 20 comprises two selection TFTs 100, 200 and a transfer TFT 300. If both selection TFTs 100, 200 are activated, they connect the enable line 22 to the gate of the transfer TFT 300 in order to switch it on or off respectively. When the transfer TFT 300 is switched on, the analogue voltage from the analogue line 22 will be applied to pixel electrode 500.

Due to the random access of each pixel electrode 500 by the cluster configuration, it is possible to control that a certain analogue voltage, provided by the panel electronic, is sequentially applied to several pixel cells with arbitrary positions within the cluster 18. Subsequently, the voltage on the analog line 22 is increased and the appropriate pixels are selected to be addressed. Once they are, the voltage being applied on the analog line 22 is applied to a such a pixel electrode 50 or to such a group of pixel electrodes 500.

Figure 12:
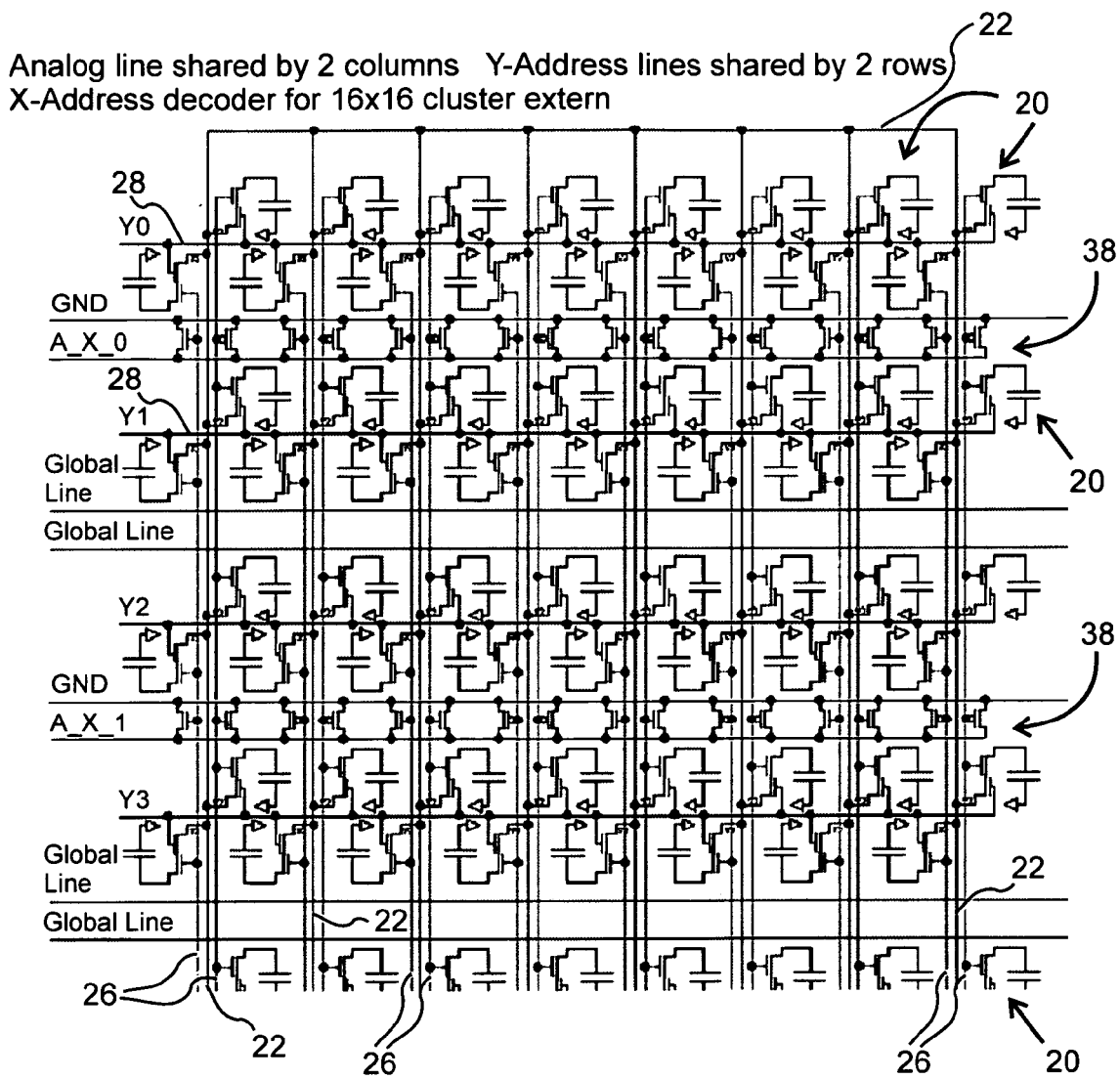
FIG. 12 shows an example of an x-address decoder comprising Dynamic-NOR circuits for 2 TFT pixel circuits, wherein the x-address decoder is embedded in between the pixel circuits.

The address decoders 50 schematically depicted beside the cluster 18 in FIG. 31 are actually implemented such that they are distributed over the pixel circuits 20 of the entire cluster 18, as shown e.g. in FIG. 12. This will avoid gaps in between the clusters.

In contrast to prior art AM backplanes, maximum frame rate of the cluster based approach only depends on the maximum switching frequencies of implemented TFTs 100, 200, 300.

The writing of the frame—and therefore the assignment of pixel values to the pixels—starts with the initialization. First an "On"-value (for instance 6V) is applied to the enable line 22. Then all x- and y-addressing lines 26, 28 being connected to the gates of the X- and Y-selection TFTs 100, 200 are switched to an "On" value (for instance also 6V). Now all transfer TFTs 300 are conductive and all electrodes 500 are simultaneously connected to the analog line 22. The already stored charges of the pixel electrodes 500 from a preceding writing of a frame are equalized and all pixel electrodes 500 are charged to either 0V or to another desired pre-charge voltage V via the analogue line 22. In the following, 0V is assumed as an initialization value.

Now the disable phase of the pixel circuits 20 starts. A ramp-up voltage (the voltage characteristic 10) is applied to the analog line 22 by the panel electronics. In this example the ramp-up starts with the lowest voltage, i.e. 0V. With this example of driving mode all transfer TFTs 300 still remain enabled and therefore conductive. This means that changing the voltage V applied on the analog line 22 will change the voltages over all pixel electrodes 500.

Now all transfer TFTs 300 being connected to the pixel electrodes 500 that should be set to a value of 0V are made non-conductive (deactivated). The enable-line 30 is connected to the gate of these transfer-TFTs 300 via the selection TFTs 100, 200. The enable-line 30 is now switched to a disable value 0V. To discharge the gate of these transfer TFTs 300, both selection TFTs 100, 200 must be switched "On" for removing the charge stored on the gate capacity of the transfer-TFT 300 while the enable line 30 remains in low state (for example at 0V). This procedure is repeated several times until all pixel electrodes 500 of same voltage (here 0V) have been addressed and have been disconnected from the analog line 22.

In a next step the voltage applied on the analog line 22 is increased to a higher value (for instance to 1V) and this amount is applied to all pixel electrodes 500, except for those that were already disabled in the previously described first step. All pixel electrodes 500 that should store 1V are isolated by individual deactivation operations, comprising to switch the selection TFTs 100, 200 "On" and the enable line 30 "Off". Then the ramp-up voltage and pixel deactivation continues, until all voltage levels which are to be assigned to the pixels are completed.

Figure 5:
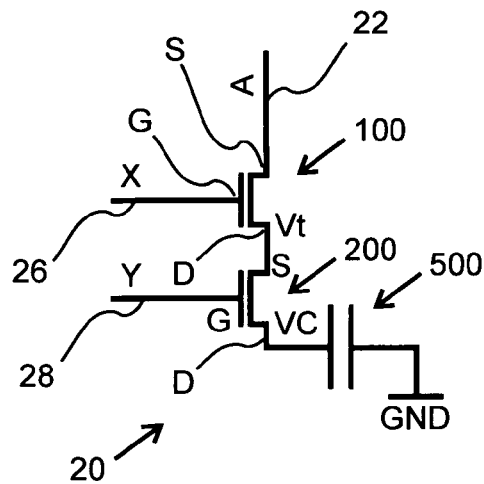
Figure 29:
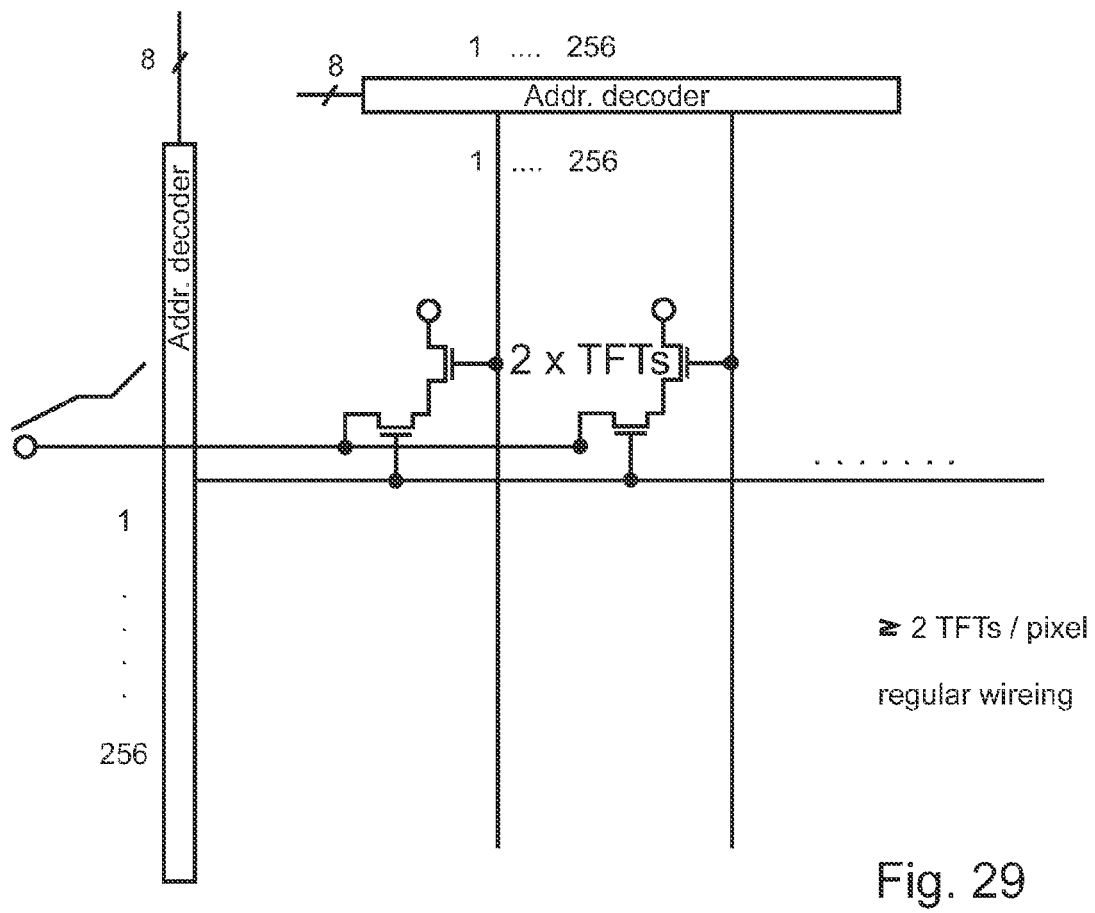
FIG. 29 shows an example of an embodiment of the present invention, where a part of the circuitry of the backplane is shown, especially the circuitry of two pixels comprising 2 TFTs.

FIGS. 5 and 29 show an example of a control circuit 20 (or pixel circuit) for a pixel comprises two TFTs 100, 200 according to the first embodiment mentioned above. The source S of the first TFT 100 is connected to the analog line 22, the gate G of the first TFT 100 is connected to an x-addressing line 26 and the drain D of the first TFT 100 is connected to the second TFT 200. The source S of the second TFT 200 is connected to the drain D of the first TFT 100, the gate G of the second TFT 200 is connected to a y-addressing line 28 and the drain D of the second TFT 200 is connected to the electrode 500 of the pixel. The electrode 500 of the pixel is indicated as a capacitor. It is noted that even though the first TFT 100 is connected to the x-addressing line 26 and the second TFT 200 is connected to the y-addressing line 28, it could also be vice versa, i.e. the first TFT 100 could be connected to the y-addressing line 28 and the second TFT 200 could be connected to the x-addressing line 26 instead.

It might be advantageous to combine the two transistors 100, 200 with the gates G connected to the x- and y-addressing lines 26, 28 into a single dual-gate transistor (not shown in FIG. 5) and this is also applicable for the further examples.

In the further embodiments, the TFTs 100, 200 connected to the x and y address lines 26, 28, respectively, have the function of selection TFTs, selecting, if the transfer TFT 300 is switched on or off by controlling the voltage on the gate of the transfer TFT 300. The source S of the transfer TFT 300 is connected to the analog line 22 and the drain D is connected to the pixel electrode 500. If this transistor 300 is switched on, the charges are transferred from the analog line 22 to the pixel electrode 500. If the transistor 300 is switched off, the actual charge is stored on the pixel electrode 500 defining the pixel value.

Figure 6:
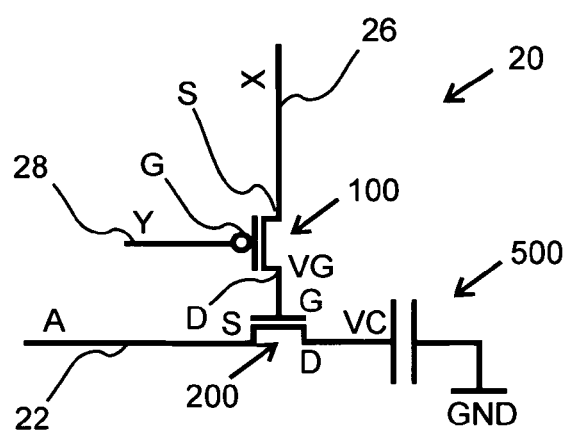

FIG. 6 shows an example of a control circuit 20 for a pixel comprising two TFTs 100, 200 according to the second embodiment mentioned above. The first TFT 100—a selection TFT—is connected to an x-addressing line 26, to a y-addressing line 28 and to the second TFT 200. The second TFT 200—a transfer TFT—is connected to the first TFT 100, to the analog line 22 and to the electrode 500 of the pixel. Such a pixel circuit 20 is comparable to a circuit of a DRAM (Dynamic Random Access Memory) storage cell. The following address scheme needs to be applied, if the pixel is to be addressed, depending on whether a n-channel or a p-channel transfer TFT 200 or n-channel or p-channel selection TFTs 100 are used (X=signal being applied to the x-addressing line 26, Y=signal being applied to the y-addressing line 28):

| X | Y | |
|---|---|---|
| n-channel-transfer TFT & n-channel-selection TFT | | |
| 0 | 1 | disable |
| 1 | 1 | enable |
| p-channel-transfer TFT & n-channel-selection TFT | | |
| 1 | 1 | disable |
| 0 | 1 | enable |
| p-channel-transfer TFT & p-channel-selection TFT | | |
| 1 | 0 | disable |
| 0 | 0 | enable |
| n-channel-transfer TFT & p-channel-selection TFT | | |
| 0 | 0 | disable |
| 1 | 0 | enable |

FIG. 7 shows an example of a control circuit 20 for a pixel comprising three TFTs 100, 200, 300 according to the third embodiment mentioned above. The first TFT 100 is connected to the enable line 30, to an x-addressing line 26 and to the second TFT 200. The second TFT 200 is connected to the first TFT 100, to a y-addressing line 28 and to the third TFT 300. The third TFT 300—also called transfer TFT—is connected to the second TFT 200, to the analog line 22 and to the electrode 500 of the pixel. Depending on whether a n-channel or a p-channel transfer TFT 300 or n-channel or p-channel selection TFTs 100, 200 are used, the following control schemes need to be applied (X=signal being applied to the x-addressing line 26, Y=signal being applied to the y-addressing line 28, EN=signal being applied to the enable line 30):

| X | Y | EN | |
|---|---|---|---|
| n-channel-transfer TFT & n-channel-selection TFT | | | |
| 1 | 1 | 0 | disable |
| 1 | 1 | 1 | enable |
| p-channel-transfer TFT & n-channel-selection TFT | | | |
| 0 | 0 | 0 | disable |
| 0 | 0 | 1 | enable |
| p-channel-transfer TFT & p-channel-selection TFT | | | |
| 0 | 0 | 1 | disable |
| 0 | 0 | 0 | enable |
| n-channel-transfer TFT & p-channel-selection TFT | | | |
| 1 | 1 | 1 | disable |
| 1 | 1 | 0 | enable |

Figure 8:
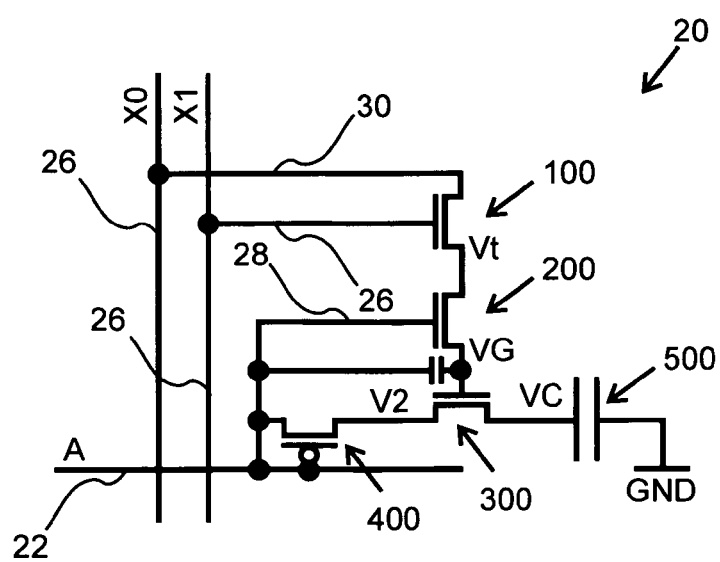
FIG. 8 shows an example of a pixel circuit of a pixel, wherein such a pixel circuit comprises 4 TFTs.

FIG. 8 shows an example of a control circuit 20 for a pixel comprising four TFTs 100, 200, 300, 400. The first TFT 100 is connected to the x-addressing line 26 (X0) of a neighbouring pixel (not shown in FIG. 8)—as an enabling function and therefore indicated with reference numeral 30 —, to an x-addressing line 26 and to the second TFT 200. The second TFT 200 is connected to the first TFT 100, to a y-addressing line 28 and to the third TFT 300. The y-addressing line 28 is generated with the help of the fourth TFT 400 from the analog line 22. The third TFT 300—also called transfer TFT—is connected to the second TFT 200, to the analog line 22—via the fourth TFT 400—and to the electrode 500 of the pixel.

Figure 9:
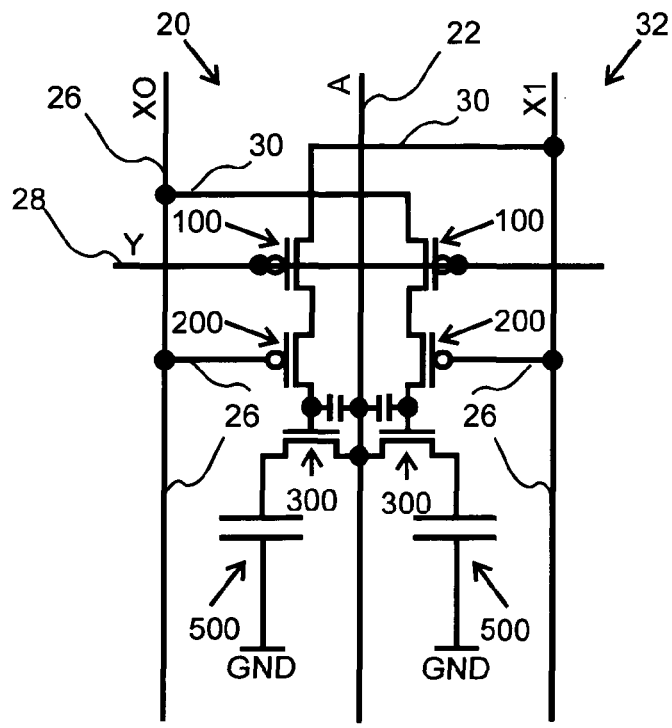
FIG. 9 shows an example of two neighbouring pixels of the backplane device for the spatial light modulator, wherein each pixel comprises a pixel circuit comprising 3 TFTs.

FIG. 9 shows an example of two control circuits 20, 32 for two neighbouring pixels, each control circuit 20 or 32 comprising three TFTs 100, 200, 300 according to the fourth embodiment mentioned above. The two pixels are addressed by the same y-addressing line 28. The first TFT 100 of the first pixel circuit 20 is connected to the x-addressing line 26 (X1) of the second pixel circuit 32—as an enabling function and therefore indicated with reference numeral 30—, to the y-addressing line 28 and to the second TFT 200 of the first pixel circuit 20. The second TFT 200 of the first pixel circuit 20 is connected to the first TFT 100 of the first pixel circuit 20, to an x-addressing line 26 (X0) of the first pixel circuit 20 and to the third TFT 300 of the first pixel circuit 20. The third TFT 300 of the first pixel circuit 20 is connected to the second TFT 200 of the first pixel circuit 20, to the analog line 22 and to the electrode 500 of the first pixel circuit 20. The first TFT 100 of the second pixel circuit 32 is connected to the x-addressing line 26 (X0) of the first pixel circuit 20—as an enabling function and therefore indicated with reference numeral 30—, to the y-addressing line 28 and to the second TFT 200 of the second pixel circuit 32. The second TFT 200 of the second pixel circuit 32 is connected to the first TFT 100 of the second pixel circuit 32, to an x-addressing line 26 (X1) of the second pixel circuit 32 and to the third TFT 300 of the second pixel circuit 32. The third TFT 300 of the second pixel circuit 32 is connected to the second TFT 200 of the second pixel circuit 32, to the analog line 22 and to the electrode 500 of the second pixel circuit 32. This embodiment does not have to have a separate enable line on the backplane device for the enablement functionality of a pixel. This is achieved by using the x-addressing line of the one pixel as the enable line for the other pixel of the two neighbouring pixels. This can be done, if the logic level of the enable line corresponds to the logic level of the x-addressing lines. Depending on whether a n-channel or p-channel transfer TFT 300 or n-channel or p-channel selection TFTs 100, 200 are used, the following control schemes need to be applied (X0, X1=signal being applied to the respective x-addressing line 26, Y=signal being applied to the y-addressing line 28):

| Y | X1 | X0 | |
|---|---|---|---|
| n-channel-transfer TFT & n-channel-selection TFT | | | |
| 1 | 1 | 1 | enable both |
| 1 | 0 | 1 | disable left |
| 1 | 1 | 0 | disable right |
| p-channel-transfer TFT & n-channel-selection TFT | | | |
| 1 | 1 | 1 | disable both |
| 1 | 0 | 1 | enable left |
| 1 | 1 | 0 | enable right |
| p-channel-transfer TFT & p-channel-selection TFT | | | |
| 0 | 0 | 0 | enable both |
| 0 | 1 | 0 | disable left |
| 0 | 0 | 1 | disable right |
| n-channel-transfer TFT & p-channel-selection TFT | | | |
| 0 | 0 | 0 | disable both |
| 0 | 1 | 0 | enable left |
| 0 | 0 | 1 | enable right |

Figure 10:
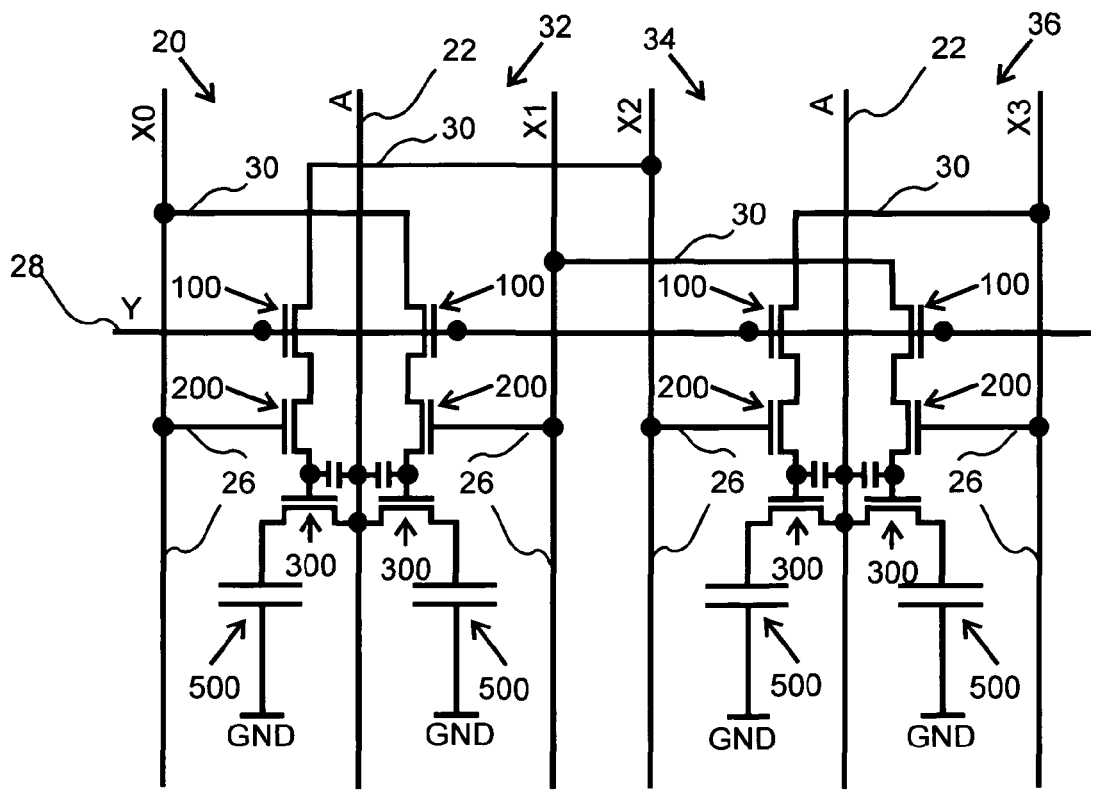
FIG. 10 shows an example of four neighbouring pixels of the backplane device for the spatial light modulator, wherein each pixel comprises a pixel circuit comprising 3 TFTs.

FIG. 10 shows an example of four control circuits 20, 32, 34, 36 for four neighbouring pixels, each control circuit 20, 32, 34 or 36 comprise three TFTs 100, 200, 300 according to the fifth embodiment mentioned above. The four pixels are located adjacent to each other and are addressed by the same y-addressing line 28. The first TFT 100 of the first pixel circuit 20 is connected to the x-addressing line 26 (X2) of the third pixel circuit 34—as an enabling function and therefore indicated with reference numeral 30—, to the y-addressing line 28 and to the second TFT 200 of the first pixel circuit 20. The second TFT 200 of the first pixel circuit 20 is connected to the first TFT 100 of the first pixel circuit 20, to an x-addressing line 26 (X0) of the first pixel circuit 20 and to the third TFT 300 of the first pixel circuit 20. The third TFT 300 of the first pixel circuit 20 is connected to the second TFT 200 of the first pixel circuit 20, to the analog line 22 and to the electrode 500 of the first pixel circuit 20. The first TFT 100 of the second pixel circuit 32 is connected to the x-addressing line 26 (X0) of the first pixel circuit 20—as an enabling function and therefore indicated with reference numeral 30—, to the y-addressing line 28 and to the second TFT 200 of the second pixel circuit 32. The second TFT 200 of the second pixel circuit 32 is connected to the first TFT 100 of the second pixel circuit 32, to an x-addressing line 26 (X1) of the second pixel circuit 32 and to the third TFT 300 of the second pixel circuit 32. The third TFT 300 of the second pixel circuit 32 is connected to the second TFT 200 of the second pixel circuit 32, to the analog line 22 and to the electrode 500 of the second pixel circuit 32. The first TFT 100 of the third pixel circuit 34 is connected to the x-addressing line 26 (X3) of the fourth pixel circuit 36—as an enabling function and therefore indicated with reference numeral 30—, to the y-addressing line 28 and to the second TFT 200 of the third pixel circuit 34. The second TFT 200 of the third pixel circuit 34 is connected to the first TFT 100 of the third pixel circuit 34, to an x-addressing line 26 (X2) of the third pixel circuit 34 and to the third TFT 300 of the third pixel circuit 34. The third TFT 300 of the third pixel circuit 34 is connected to the second TFT 200 of the third pixel circuit 34, to the analog line 22 and to the electrode 500 of the third pixel circuit 34. The first TFT 100 of the fourth pixel circuit 36 is connected to the x-addressing line 26 (X1) of the second pixel circuit 32—as an enabling function and therefore indicated with reference numeral 30—, to the y-addressing line 28 and to the second TFT 200 of the fourth pixel circuit 36. The second TFT 200 of the fourth pixel circuit 36 is connected to the first TFT 100 of the fourth pixel circuit 36, to an x-addressing line 26 (X3) of the fourth pixel circuit 36 and to the third TFT 300 of the fourth pixel circuit 36. The third TFT 300 of the fourth pixel circuit 36 is connected to the second TFT 200 of the fourth pixel circuit 36, to the analog line 22 and to the electrode 500 of the fourth pixel circuit 36. Likewise to the fourth embodiment, this embodiment does not have to have a separate enable line on the backplane device for the enablement functionality of a pixel. This can be achieved, if for one pixel, the x-addressing line of one of the other pixels of the four neighbouring pixels is used as the enable line for this pixel. This can be done, if the logic level of the enable line corresponds to the logic level of the x-addressing lines. Depending on whether a n-channel or p-channel transfer TFT 300 or n-channel or p-channel selection TFTs 100, 200 are used, the following control schemes need to be applied (X0, X1, X2, X3=signal being applied to the respective x-addressing line 26, Y=signal being applied to the y-addressing line 28):

| Y | X3 | X2 | X1 | X0 | |
|---|---|---|---|---|---|
| n-channel-transfer TFT & n-channel-selection TFT | | | | | |
| 1 | 1 | 1 | 1 | 1 | enable all |
| 1 | 0 | 0 | 0 | 1 | disable Pixel at X3 |

-continued

| Y | X3 | X2 | X1 | X0 | |
|---|----|----|----|----|---|
| 1 | 0 | 0 | 1 | 0 | disable Pixel at X2 |
| 1 | 0 | 1 | 0 | 0 | disable Pixel at X1 |
| 1 | 1 | 0 | 0 | 0 | disable Pixel at X0 |
| 1 | 1 | 0 | 0 | 1 | disable Pixel at X0 & X3 |
| 1 | 0 | 1 | 1 | 0 | disable Pixel at X1 & X2 |
| 1 | 1 | 0 | 1 | 0 | enable Pixel at X0 (disable at X2) |
| 1 | 1 | 1 | 0 | 0 | enable Pixel at X1 (disable at X0) |
| 1 | 0 | 0 | 1 | 1 | enable Pixel at X2 (disable at X3) |
| 1 | 0 | 1 | 0 | 1 | enable Pixel at X3 (disable at X1) |
| p-channel-transfer TFT & n-channel-selection TFT | | | | | |
| 1 | 1 | 1 | 1 | 1 | disable all |
| 1 | 0 | 0 | 0 | 1 | enable Pixel at X3 |
| 1 | 0 | 0 | 1 | 0 | enable Pixel at X2 |
| 1 | 0 | 1 | 0 | 0 | enable Pixel at X1 |
| 1 | 1 | 0 | 0 | 0 | enable Pixel at X0 |
| 1 | 1 | 0 | 0 | 1 | enable Pixel at X0 & X3 |
| 1 | 0 | 1 | 1 | 0 | enable Pixel at X1 & X2 |
| 1 | 0 | 1 | 0 | 1 | disable Pixel at X0 (enable at X2) |
| 1 | 0 | 0 | 1 | 1 | disable Pixel at X1 (enable at X0) |
| 1 | 1 | 1 | 0 | 0 | disable Pixel at X2 (enable at X3) |
| 1 | 1 | 0 | 1 | 0 | disable Pixel at X3 (enable at X1) |
| p-channel-transfer TFT & p-channel-selection TFT | | | | | |
| 0 | 0 | 0 | 0 | 0 | enable all |
| 0 | 1 | 1 | 1 | 0 | disable Pixel at X3 |
| 0 | 1 | 1 | 0 | 1 | disable Pixel at X2 |
| 0 | 1 | 0 | 1 | 1 | disable Pixel at X1 |
| 0 | 0 | 1 | 1 | 1 | disable Pixel at X0 |
| 0 | 0 | 1 | 1 | 0 | disable Pixel at X0 & X3 |
| 0 | 1 | 0 | 0 | 1 | disable Pixel at X1 & X2 |
| 0 | 0 | 1 | 0 | 1 | enable Pixel at X0 (disable at X2) |
| 0 | 0 | 0 | 1 | 1 | enable Pixel at X1 (disable at X0) |
| 0 | 1 | 1 | 0 | 0 | enable Pixel at X2 (disable at X3) |
| 0 | 1 | 0 | 1 | 0 | enable Pixel at X3 (disable at X1) |
| n-channel-transfer TFT & p-channel-selection TFT | | | | | |
| 0 | 0 | 0 | 0 | 0 | disable all |
| 0 | 1 | 1 | 1 | 0 | enable Pixel at X3 |
| 0 | 1 | 1 | 0 | 1 | enable Pixel at X2 |
| 0 | 1 | 0 | 1 | 1 | enable Pixel at X1 |
| 0 | 0 | 1 | 1 | 1 | enable Pixel at X0 |
| 0 | 0 | 1 | 1 | 0 | enable Pixel at X0 & X3 |
| 0 | 1 | 0 | 0 | 1 | enable Pixel at X1 & X2 |
| 0 | 0 | 1 | 0 | 1 | disable Pixel at X0 (enable at X2) |
| 0 | 0 | 0 | 1 | 1 | disable Pixel at X1 (enable at X0) |
| 0 | 1 | 1 | 0 | 0 | disable Pixel at X2 (enable at X3) |
| 0 | 1 | 0 | 1 | 0 | disable Pixel at X3 (enable at X1) |

Figure 11:
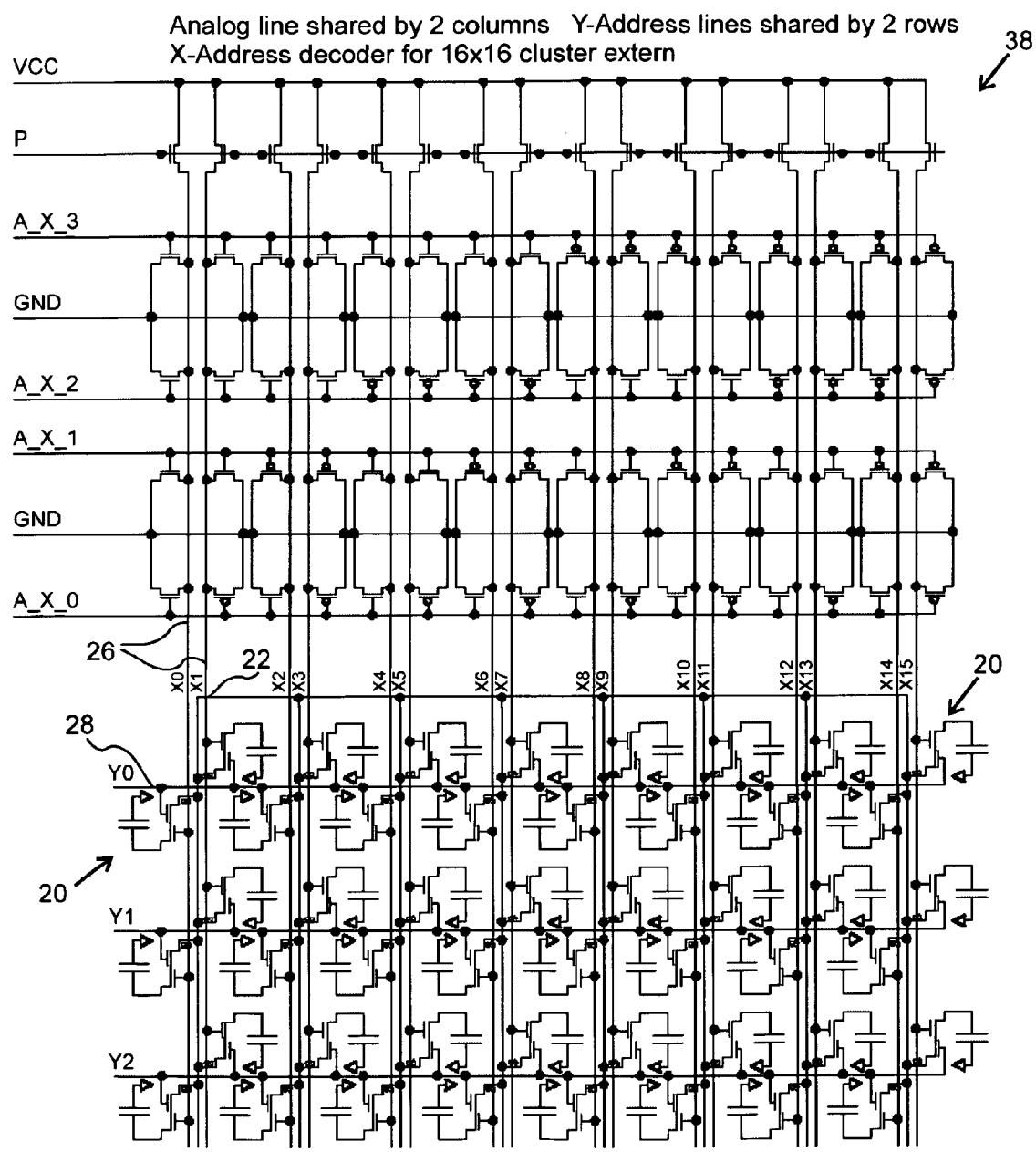
FIG. 11 shows an example of an x-address decoder comprising Dynamic-NOR circuits (top of the representation) for 2 TFT pixel circuits (shown in the bottom of the representation)

FIG. 11 shows an example of an x-address decoder 38 comprising Dynamic-NOR circuits being indicated on the top of the representation of FIG. 11. The x-address decoder 38 can be used for addressing all pixel circuits 20 comprising the two TFTs, which are shown in the bottom of the representation of FIG. 11. The x-address decoder 38 could, for example, be located at the outside edge of the backplane device. The pixels circuits 20 as shown in the bottom of FIG. 11 are comparable to the pixels circuits as shown in FIG. 5.

FIG. 12 shows an example of an x-address decoder 38 comprising dynamic-NOR circuits for the two TFT pixel circuits 20. In this embodiment, the x-address decoder 38 is embedded between the pixel circuits 20. In a similar manner, the y-address decoder (not shown in FIG. 12) could also be embedded between the pixel circuits 20.

Figure 13A:
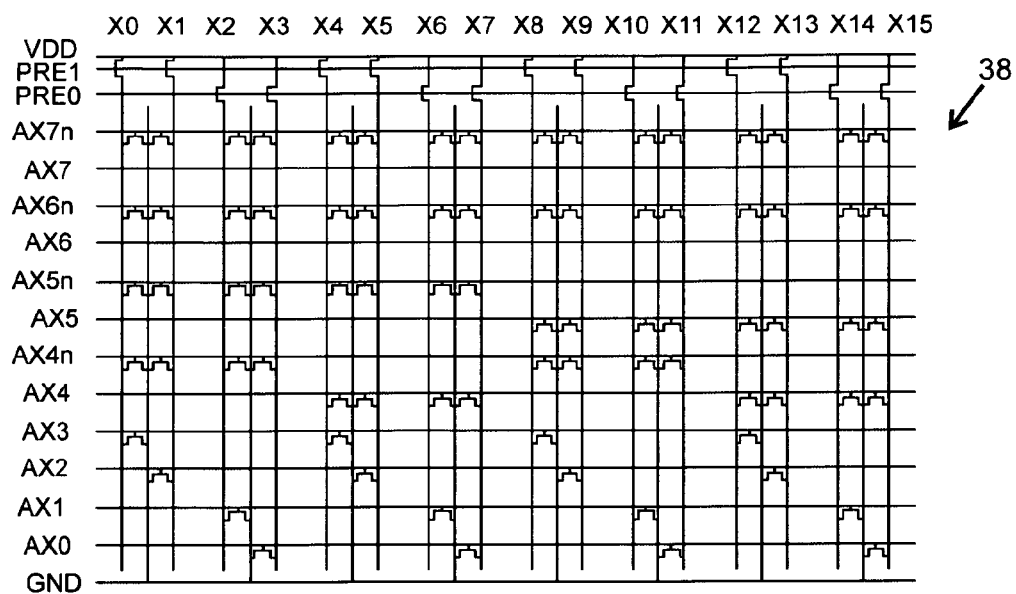
FIG. 13a shows a detail of an example of an x-address decoder comprising Dynamic-NOR circuits for addressing 16 x-addressing lines.

FIG. 13a shows a detail of an example of an x-address decoder 38 which comprises dynamic-NOR circuits. This address decoder as shown in FIG. 13a is used for addressing sixteen x-addressing lines, indicated by X0, . . . , X15.

Figure 13B:
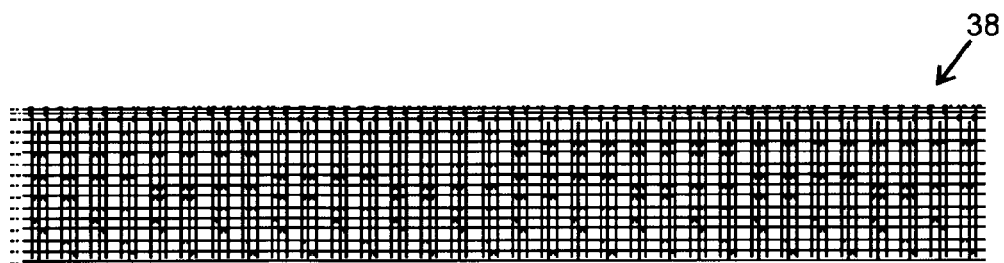
FIG. 13b shows the x-address decoder comprising Dynamic-NOR circuits for 3 TFT pixel circuits for addressing 64 x-addressing lines.

FIG. 13b shows the x-address decoder 38 of FIG. 13a for addressing 64 x-addressing lines. This decoder comprises dynamic-NOR circuits being suitable to address three TFT pixel circuits 20.

Figure 14:
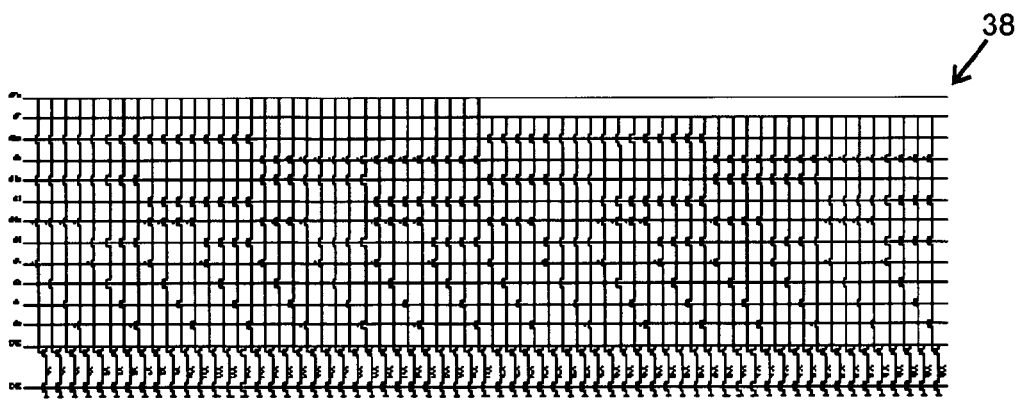
FIG. 14 shows an example of an x-address decoder comprising Dynamic-AND elements.

FIG. 14 shows an example of an x-address decoder 38 which comprises dynamic-NAND components. These components can be composed from CMOS-elements.

Figure 15:
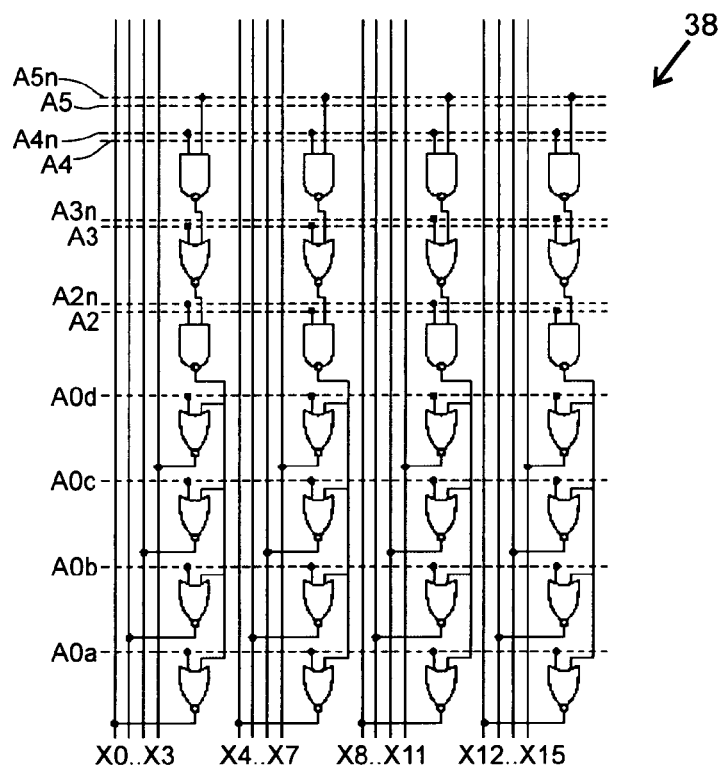
FIG. 15 shows an example of an x-address CMOS-decoder comprising NAND and NOR elements.
Figure 16:
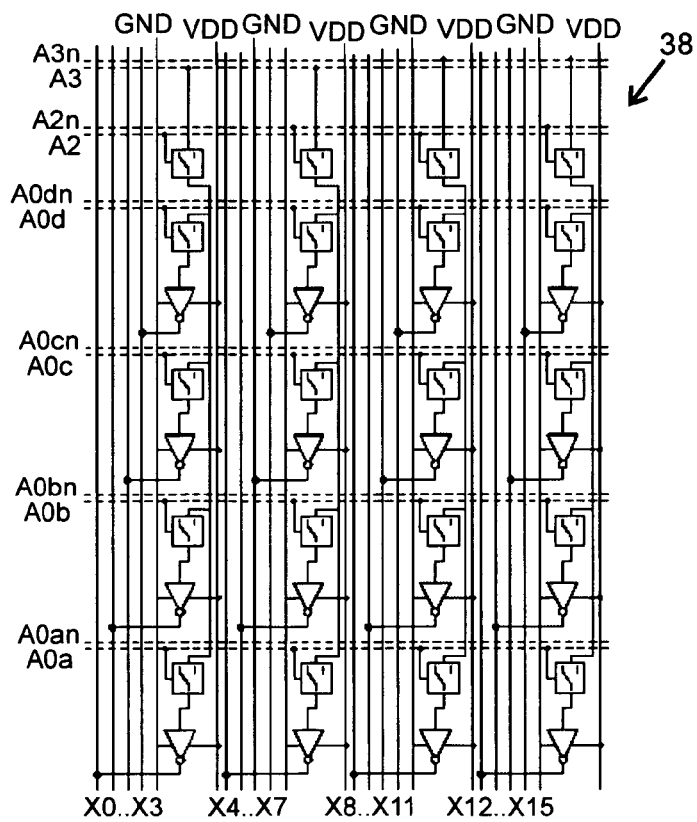
FIG. 16 shows an example of an x-address decoder comprising OR elements.

The x-address decoder 38 as shown in FIG. 15 is suitable for addressing 16 TFTs on the x-addressing lines X0 to X15 and FIG. 16 shows an example of an x-address decoder 38 comprising OR elements.

Figure 17:
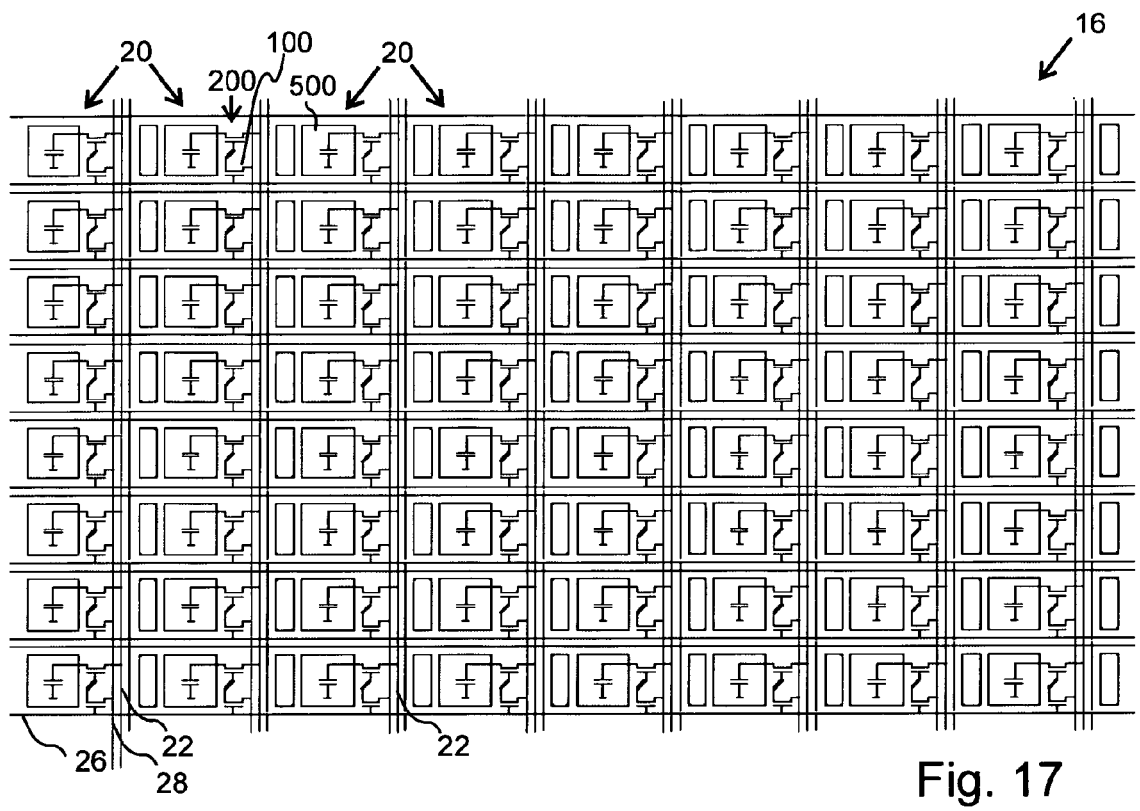
FIG. 17 shows an example of a regular arrangement of pixel circuits of the backplane device according to the invention without address decoder circuits being located between the pixel circuits.

FIG. 17 shows an example of a regular arrangement of pixel circuits 20 of the backplane device 16. The pixel circuits 20 as shown in FIG. 17 comprise two TFTs 100, 200. As can be seen in FIG. 17, the pixel control circuits 20 are arranged in a regular layout, i.e. pixel circuits 20 are oriented in same way.

Figure 18:
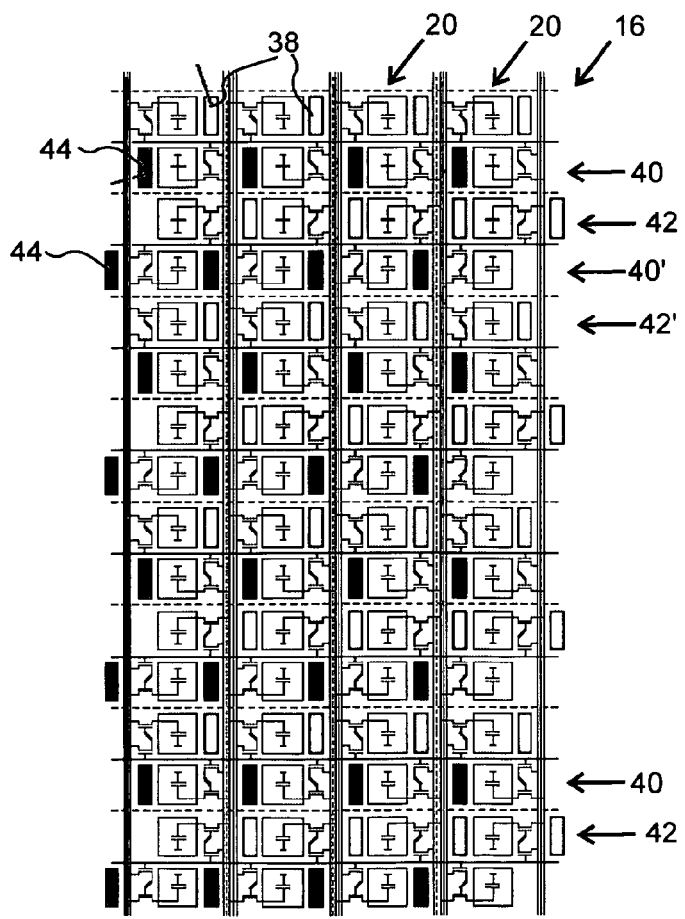
FIG. 18 shows an example of an arrangement of pixel circuits being mirrored in one direction of the backplane device according to the invention.

FIG. 18 shows an example of an arrangement of pixel circuits 20, wherein the pixel circuits 20 of one row 40 is mirrored to the pixel circuits of a second row 42. The axis of symmetry or mirror axis is located horizontally between the two rows 40, 42. The arrangement of pixel circuits according to FIG. 18 comprises the x-address decoder 38 and y-address decoder 44 between the pixel circuits 20 on the backplane device 16 itself. Furthermore, the first row 40' is the mirror image of the second row 42', wherein the axis of symmetry is located horizontally between the two rows 40', 42'. With regard to symmetry, it can be noted, that row 40 is the mirror image of another row 40', wherein the axis of symmetry for such a mirroring axis is located in a vertical direction. The same is true with a row 42 and 42'.

Figure 19:
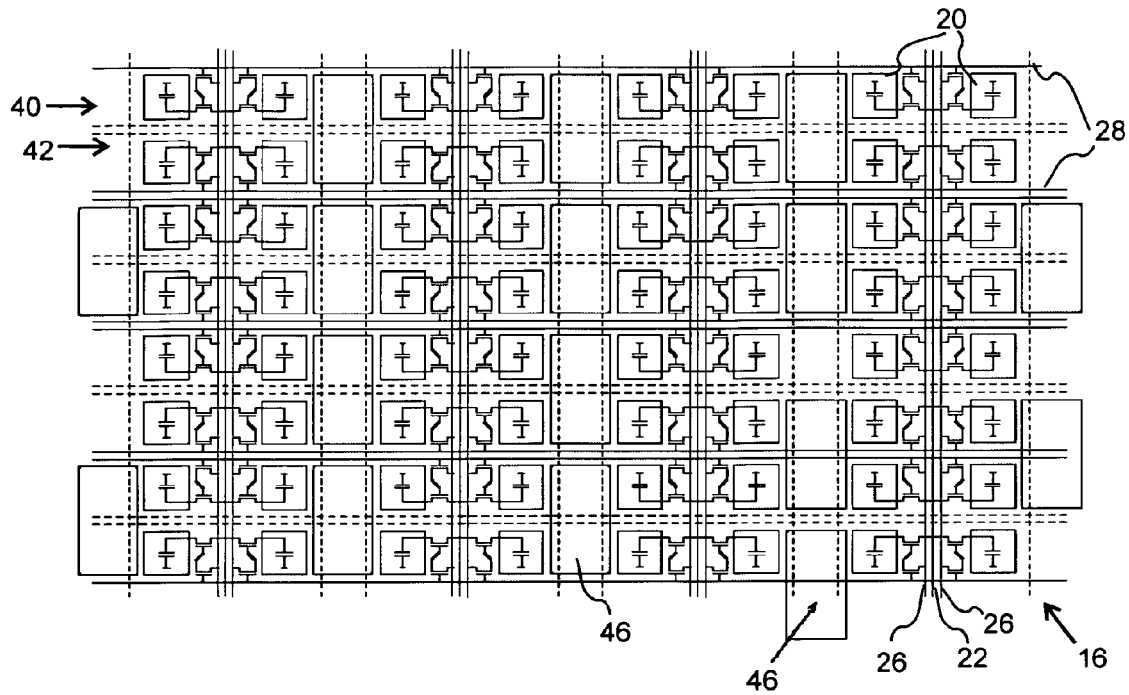
FIG. 19 shows an example of an arrangement of pixel circuits being mirrored in two directions of the backplane device according to the invention.

FIG. 19 shows an example of an arrangement of pixel circuits 20 being mirrored in two directions of the backplane device 16 as can be seen for example with the four pixel circuits 20 being located on the right hand side and at the top of FIG. 19. The pixel circuits 20 of the right most columns is the mirror image of the column of pixel circuits being located with the left, wherein the mirror axis can be regarded as for example the analog line 22. Furthermore, the top row 40 can be regarded as the mirror image of the row 42 being located next to the top row 40. The mirror axis or axis of symmetry can be regarded as a horizontal line between row 40 and row 42.

The pixels circuits 20 as shown in FIG. 19 are comparable to the pixel circuits 20 of FIGS. 17 and/or 18, except for their orientation. The rectangles 46 as shown in FIG. 19 indicate possible locations of address decoders for the pixel circuits 20, the address decoder circuits are not shown in FIG. 19.

Figure 20:
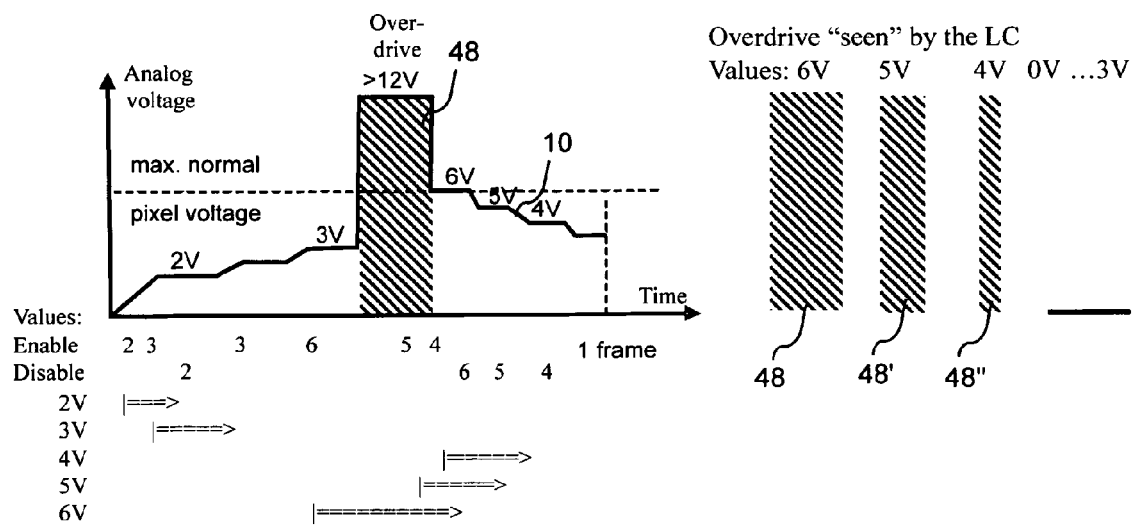
FIG. 20 shows in a schematic diagram of an example of the voltage characteristic comprising an adaptive overdrive value to be applied on an analog line of a backplane device, FIGS. 21 and 22 each show in a schematic diagram of an example of the voltage characteristic to be applied to a pixel according to the prior art, FIG. 23 to 25 each show in a schematic diagram of an example of the voltage characteristic to be applied to a pixel according to the present invention.

FIG. 20 shows in a schematic diagram an example for an adaptive overdrive being possible with the value sorted addressing approach according to the present invention. In contrast to the normal AM driving scheme with overdrive according to the present invention and especially in the cluster concept (using the 3-TFT approach), pixel electrodes 500 can remain connected to the analogue line 22 for much longer periods of the total frame time. The overdrive values can be applied for a long, medium or short period of time, depending on the desired pixel value to be assigned to a pixel.

At the moment when a pixel electrode is disconnected from the analog line, the pixel voltage is much closer to the exact voltage (representing the pixel value) needed to switch the LC (Liquid Crystals) molecules of a spatial light modulator to the desired pixel value than it would be in a standard overdrive scheme. In contrast to a standard control according to the prior art, according to the present invention it is possible to apply an overdrive voltage being higher than the voltage normally used to switch a pixel fully on.

FIG. 20 shows an overdrive pulse 48 with a value of 12V as it is "seen" by the LC molecules of the pixels with a normal maximal pixel voltage of 6V (see time period between enable and disable marked by the arrows below the diagram). An overdrive pulse, e.g. 48', 48", is applied for a shorter time period to pixels to which a lower phase and voltage pixel value needs to be assigned, respectively. The time to achieve a LC molecules rotation corresponding to a static voltage of 4V is very short, if a 12V overdrive voltage is used. On the right side of FIG. 20 one can see the overdrive time and effect of the overdrive that is actually applied to a pixel. This operation mode of the method according to the invention significantly speeds up grey-to-grey switching in the on-direction.

For uniformly distributed holographic data to be displayed with a holographic display device applying a spatial light modulator and a backplane device according to the present invention, the frame time can be regarded as the sum of tOFF (being the time it takes for the LC molecules to get in the 0V or in a predetermined position) and the time the backlight is switched on (tBL), provided tOFF is at least the time to write in all pixel values (tWR). For a normal pixel data without uniformly distributed pixel values, the maximum worse case frame time is either the sum of tOFF+tBL or tWR+tON+tBL, depending on which time is longer. tON is the time it takes for the LC molecules to get in the position/orientation determined by the electrical field being generated by the electrode of a pixel. For a conventional display with a flashing backlight, this time is much longer and a minimum tWR+tOFF+tBL. Even for a conventional display with a scaning backlight, the frame time is at least tOFF+tBL. If tON is longer than tOFF, a pre-charge to maximum can be combined with a ramp-up cycle analog to the described solution.

If more than one write per frame can be performed to the pixel, the LC molecule response time can be further increased by writing additional overdrive values into the pixel. This could be applied to, for instance, 10% of the "slowest" pixels only. This overdrive can be achieved by clever sorting of the pixel values.

As a result, the value sorted approach can achieve the same frame time using only a flashing backlight as a conventional display with a more costly scanning backlight. This is essential for display types like holographic displays, which might not allow a scanning backlight. But this solution can also reduce costs for normal LC displays. For holographic displays, the frame time can be even further reduced by putting the write time (tWR) into the tOFF time.

In the following, the advantageous for LC switching times to be obtained by operation modes like underdrive and overdrive are described. For normal displays, the LC switching time effect only the motion blur but for 3D and holographic displays using time sequential separation of different views, the LC switching time defines the useable frame rate. This frame rate should be e.g. at least 2×50 Hz for a flicker free image for one user.

Standard AM displays re-write values (or assign new pixel values to pixels) only once per frame. So in fact, the possibilities to apply an overdrive are limited. It is not possible to apply a higher voltage for a shorter or a longer time because the time period is fixed and determined by the frame rate.

Figure 21:
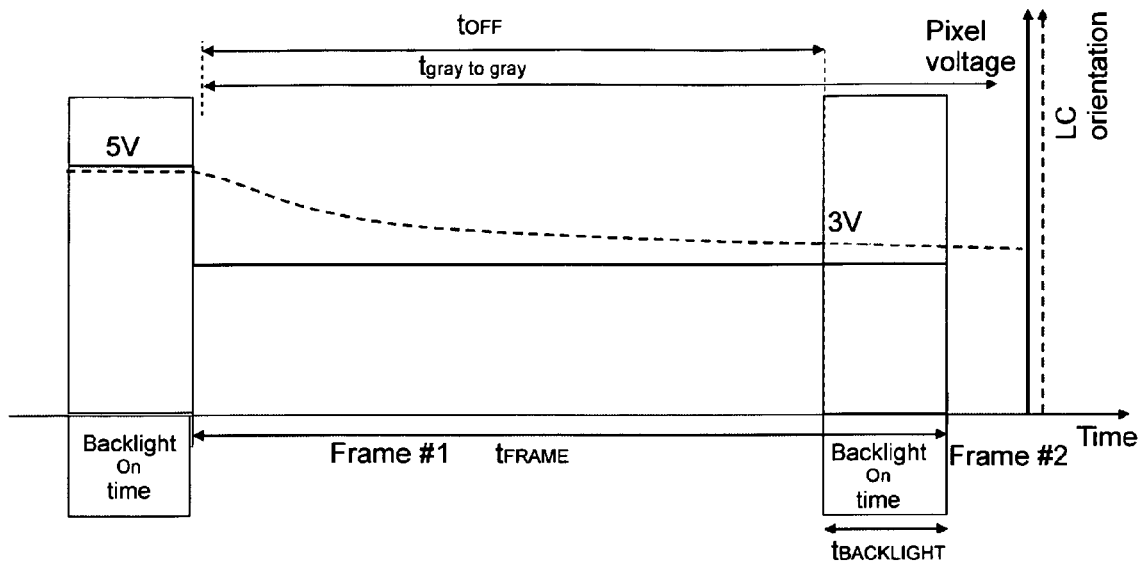
Figure 22:
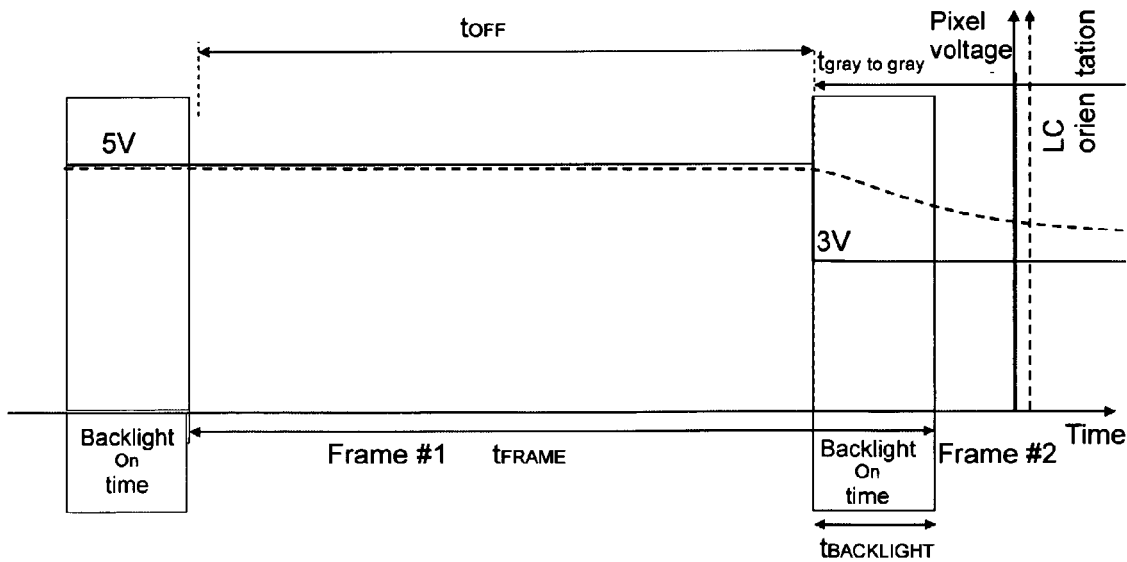

FIGS. 21 and 22 show an LC switching from 5V to 3V for a conventional AM display without an initialization to 0V. This display exhibits a slow gray to gray switching time, which is longer than in the proposed new driving scheme shown e.g. in FIG. 23 and even longer than tOFF. FIG. 21 shows the situation for an arbitrary line of a display with a scanning backlight or for the first line of a display with flashing backlight. FIG. 22 shows the relations for the last line of a display with a flashing backlight, which is even worse, because the LC molecules are not yet oriented as they should be, see the large difference between the dotted line (representing the orientation status of LC molecules) and the 3V orientation value.

In contrast to a conventional overdrive mode the value sorted approach allows to apply multiple values per frame. The value sorted approach can speed up the LC switching by applying initial values and also use LC switching times better than any other driving method.

The explanation assumes a spatial light modulator or a LC display with an LC-mode that is ON at 6V and OFF at 0V.

The rotation of the LC into the direction driven by the electrical field (tON) can be speed-up by applying a higher voltage. However, in the other direction there is a passive relaxation of the LC molecules, which is much slower (tOFF), resulting in a passive relaxation the tOFF time being much longer than tON. The special overdrive scheme can be used to speed up the switching in the on direction.

Nearly all addressing schemes allow to switch on all x- and y-addressing lines at the same time to enable all pixels by making all of the transfer TFTs conductive. This means all pixels are connected to the analog line following the voltage being applied to the analog line. This takes place at frame start to equalize the charges of the pixel capacities and set the pixel electrodes to an initial value of 0V using the analog line.

Figure 23:
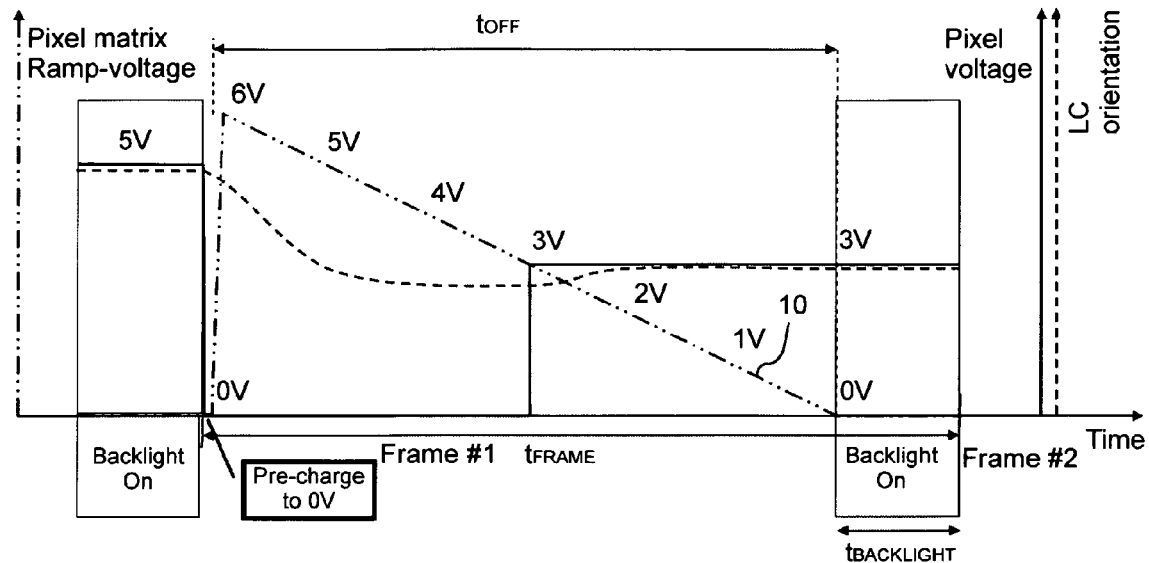
Figure 24:
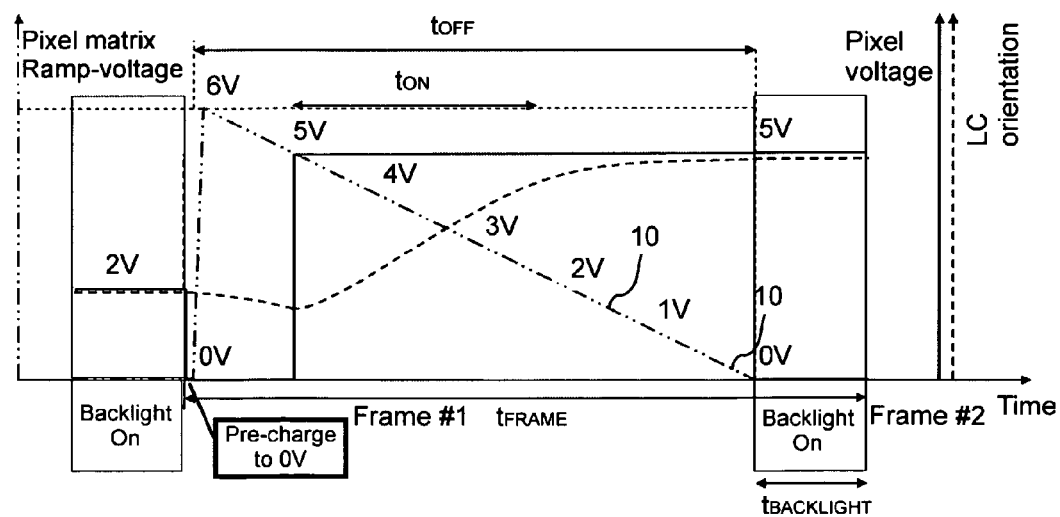
Figure 25:
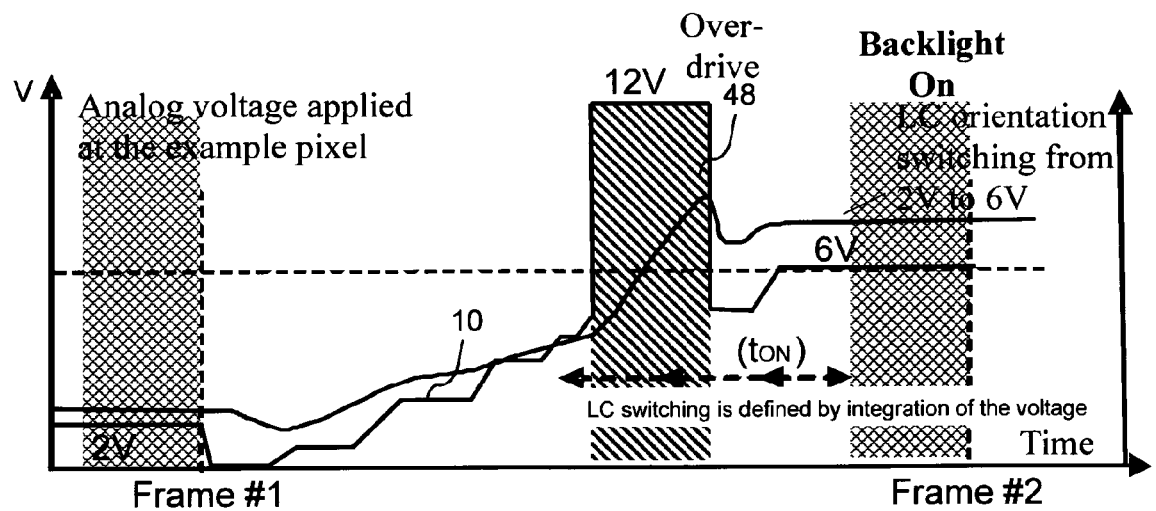
Figure 26:
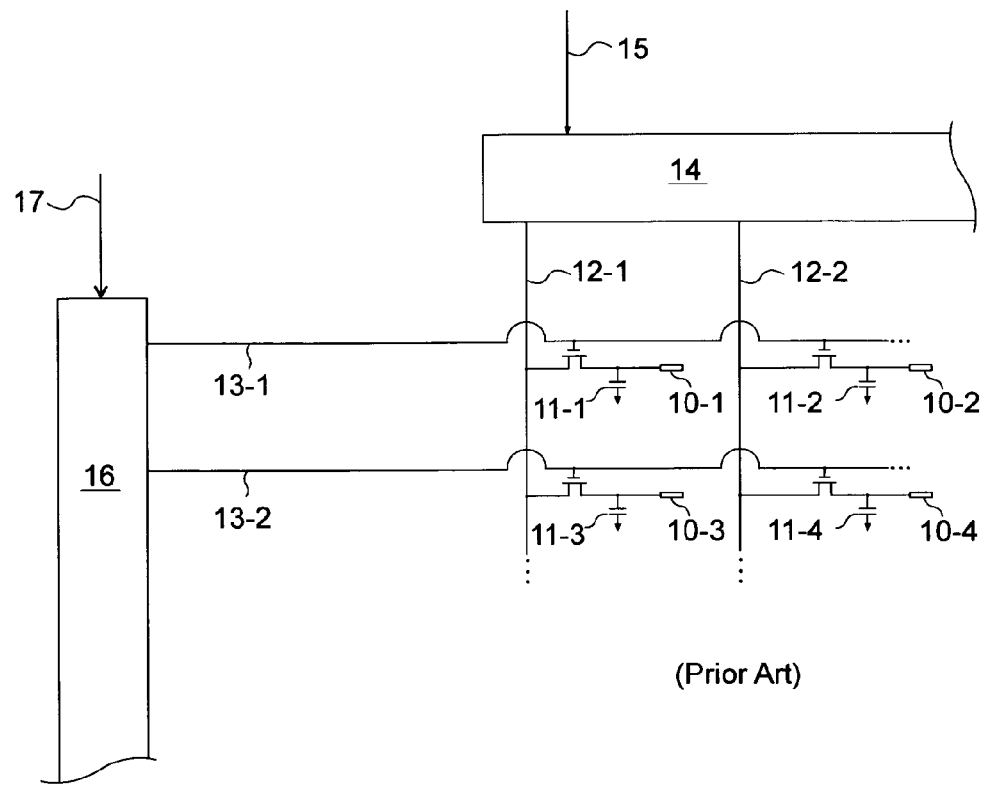
FIG. 26 shows the active matrix structure of a prior art display, with the four pixel electrodes 10-1, 10-2, 10-3, 10-4, which have corresponding pixel capacitances 11-1, 11-2, 11-3, 11-4, and which are controlled through the data lines 12-1, 12-2 and the gate lines 13-1, 13-2.

As illustrated in FIGS. 23 and 24, this implementation of the values-sorted approach according to the present invention drives all pixels to 0V value immediately after frame start, so the LC of all pixels starts turning to the off direction with maximum (passive) relaxation force. After this initialization, the address mode is changed to access only single pixels, but the pixel electrodes remain 0V until the pixel is accessed again.

Now the analog line ramp-up to the maximum value as fast as possible. Pixels switching to maximum are accessed first in frame and they only need the time of tON to switch to the final value of the LC rotation angle. After this a ramp-down cycle starts with all pixels are accessed in the order of descending values.

FIG. 24 shows the update from an old pixel value of 2V to a new pixel value of 5V. The initialisation to 0V at frame start assigns the LC molecules for this pixel to start to rotate in the wrong direction, however, this rotation by the passive relaxation is relatively slow. As soon as the new value of 5V is applied, the LC rotates back in the correct direction at even higher forces and faster times. The higher the possible rotation angle into the on-direction, the earlier the pixel is addressed, therefore minimizing the effect of a possible rotation in the wrong direction and enlarging the time from the write in of the pixel value to switching on the backlight.

All pixels with LC molecules which should rotate in the off-direction are set to the same minimum voltage value at frame start. The smaller the possible LC rotating angle, the earlier the pixel is set to the final value. Even if the rotation is more than the desired angle, as show in FIG. 23 for a gray to gray switch from 5V to 3V, switching back to the desired angle is much faster, because it is in the "on"-direction. As a result of the initialization, the gray to gray switching time in each direction should be below tOFF.

Finally, it should especially be pointed out that the exemplary embodiments discussed above serve only for describing the claimed teaching, but do not restrict said teaching to the exemplary embodiments.

Appendix

The following disclosure is provided for disclosing further information regarding to the present invention mentioned above. It is emphasized that—even though information might be provided only in the appendix and not in the description above—the appendix constitutes a part of the present application.

Figure 27:
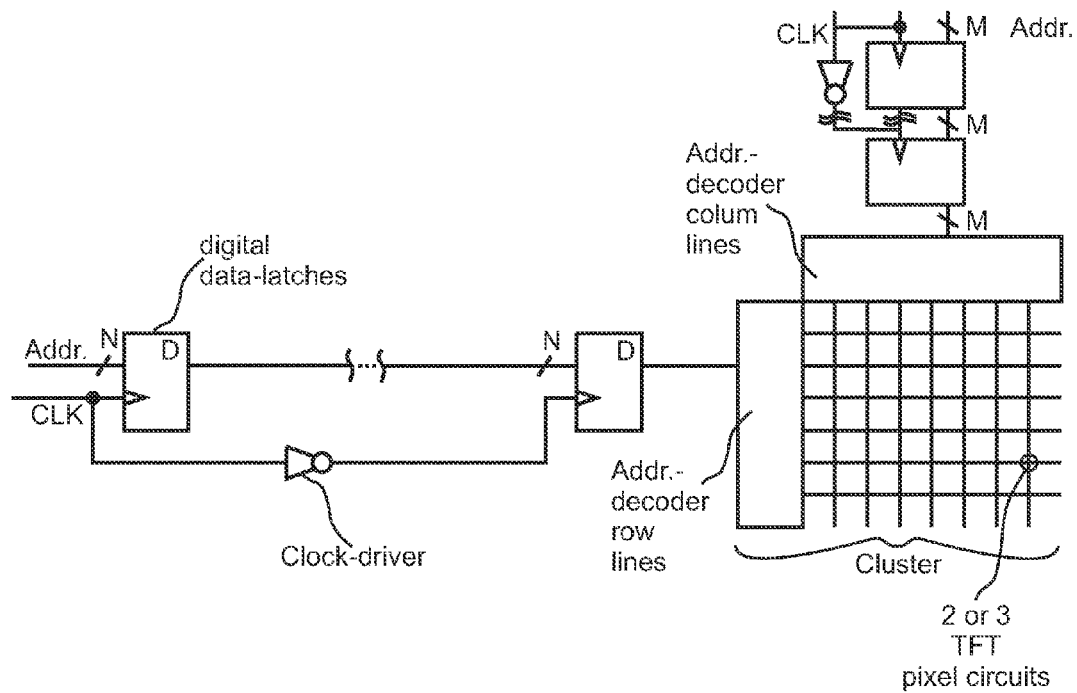
FIG. 27 shows an example of a cluster and the circuitry path to the address decoders of the cluster.

In an implementation for a LCD backplane structure clusters of pixels are used and the LCD backplane structure comprises preferably only digital switching TFTs (Thin Film Transistors). A cluster of pixels in the sense of the present application is especially a plurality of pixels forming a connected or a contiguous region of the display. Such a region might have a rectangular shape, a square shape, a honeycomb shape or any other suitable shape. Preferably, a cluster does not extend over a full width or a full length of the display. Several clusters can be arranged next to each other in a seamless manner. A cluster can be regarded as a sub-display. This is shown schematically in FIGS. 3a and 3b. FIG. 27 shows an example of a cluster and the circuitry path to the address decoders of the cluster. Therefore, in one embodiment of the invention the display is divided into clusters (sub-displays).

Whereas in a normal AM display the analog pixel values are written lines line by line thru analog data lines into the display, the backplane device for the display doesn't write alternating analog values into the single pixels line by line and column by column, but ramp up or ramp down the analog voltage from one predetermined value to another predetermined voltage value, e.g. from a minimum voltage value to a maximum voltage value. Depending on the actual applied analog voltage being assigned to a single pixel or to multiple pixels, the address or position of the pixel or the addresses or positions of the multiple pixels is—preferably digitally—transferred to the cluster. Therefore, the transfer of charge to the pixels of the display by the backplane device by voltage is sorted by the voltage value not by position, like it is done in displays known from the prior art.

The concept of the present invention can especially be applied in an advantageous way for display designs comprising backplanes using clusters, for example as disclosed in WO 2009/024523 A1, WO 2009/092717 A1, WO 2008/138983, WO 2008/138984, WO 2008/138985 or WO 2008/138986, all of which are copied with their whole content herein by reference. Furthermore, the concept of the present invention can be applied for displays displaying 2D and 3D content. 3D displays might especially be stereoscopic displays, stereoscopic displays generating multi-views, auto-stereoscopic displays with tracking of the user's eyes and holographic displays. Such a 2D or 3D display could be operated in transmissive, in reflective or in transflective mode. Such a 2D or 3D display could be working on the principle of OLED (Organic Light Emitting Diode), LCD (Liquid Crystal Display) or PDP (Plasma Display Panel). The backplane device according to the invention could be based on or comprise materials such like a-Si (amorphous Silicon), all types of polysilicon TFTs, for instance LTPS (Low Temperature Polycrystalline Silicon) or a-Oxide (amorphous Oxide), organic TFTs or single-crystal silicon.

Figure 28:
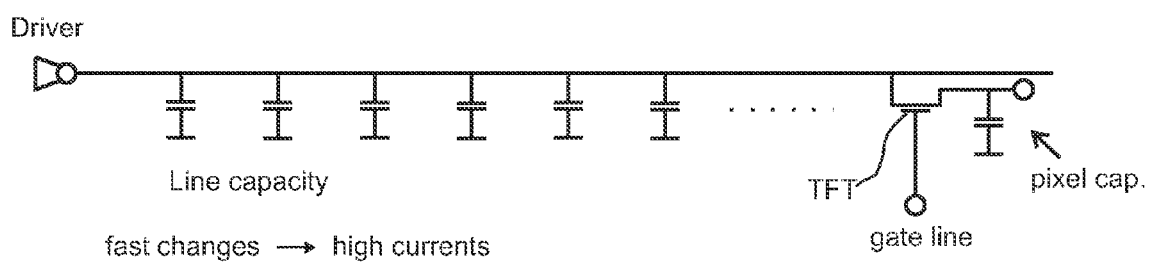
FIG. 28 shows an example of an analog line of the prior art.

The main problem of driving the analog values (the current to change the pixel capacities) very fast from the outside to the display area is solved with the concept of the present invention. The area (the number of pixels) increases with the power of two with size but the edge of the display increases only linear in its size. The large line capacities prevent faster switching frequencies on continuous analog lines. Digital lines instead can be registered and amplified after a predefined length. Reference is made to FIGS. 27 and 28.

According to a preferred embodiment of the present invention, a solution can be provided based solely on digital switching transistors. Therefore, problems with analog switching LTPS-TFTs and especially the different threshold voltages of the LTPS-TFTs are prevented.

Then, all TFTs only work as switches (ON/OFF) and no analog switching of the TFTs is needed. Advantageously, digital simulation and design tools can be used.

Furthermore, it is advantageously possible to use small LTPS TFTs for the backplane device even though the possible frame rate is much higher than it is possible with a conventional backplane design. Further advantages are:

- Relatively long transfer times allow low currents, so smaller TFTs can be used
- A lower threshold (gate) voltage of the TFTs results in a lower power consumption
- A lower gate capacity of the TFTs results in a lower power consumption of the backplane device
- The faster the TFTs can be operated, the larger the cluster size can be designed Frame Rate and Response Time
- If the power dissipation is under the upper limit, the frame rate of this backplane is only limited by the switching frequency of the TFTs. So smaller and faster TFTs result in higher frame rates with nearly no impact of line capacity. Conventional AM displays are limited with that respect, because higher frame rates need larger high current TFTs. But larger TFTs exhibit larger capacities and thereby further increasing the needed current.
- If more than one write to the pixel can be performed, the LC response time can be increased by writing additional overdrive values into the pixel. So this could be applied to for instance 10% of the "slowest" pixels only. Overdrive can easily be achieved by clever sorting of the pixel values.
- Assuming a 24 inch display with 16000 pixels×8000 pixels, one global line per pixel row and column, a backlight ON time of 50% and LTPS with 25 MHz switching frequency, the maximum frame-rate is about 200 fps (frames per second). This value is nearly the same for all cluster approaches, because the amount of data transferred into the display thru the edges together with the TFT switching frequency is the limit.
- If only pixels with new values are updated, the frame rate can be increased, if only small image changes occur. If a direct access to the image generation is established, the writes to the image buffer can be direct transfers to the display, so there is no defined frame rate any more, because changes are instantly written to the display. Because of the problem concerning the electrolysis, LCDs need constant value changes, so fully static LC displays only updating the changed pixel values are not possible. But this approach is useable by other display types like e-paper.

External Drivers
- Only one DAC (Digital to Analog Converter) per cluster is needed instead of one DAC per column line
- The DAC can be much slower, because the output frequency depends on the number of gray scale values (bit-resolution) and not the number of lines like AM-displays.
- The other signals require only digital outputs Build in System Calibration
- In system calibration can be implemented if ADCs (Analog to Digital Converters) are connected to the analog lines in the external driver ICs (Integrated Circuits). Not additional TFTs in the pixel area are needed for in system calibration. MUXes (Multiplexers) can be used to reduce the number of ADCs.
- Correcting the driven values can be done by clever sorting Power Consumption
- P~U², P~C, P~f: The high voltage analog signals driving large capacities but create relatively low power dissipation, because the analog signal is very slow changing compared to AM data-lines. Very efficient charge recycling is possible to further reduce the power dissipation.
- The high frequency digital signals only drive very small gate capacities. Today the gate (threshold) voltages are in the range or even higher than the analog signal, but if the thickness of the gate dielectric is reduced, the gate voltages can be reduced, resulting in lower power dissipation.
- If the difference between old and new pixel voltages is evaluated, clever sorting of the addressed pixel can be used to transfer charges from one pixel to another pixel or to raise of lower the value of the analog line without external driving. If the transfer can be activated and deactivated at independent times the charge recycling can be even more effective (for instance with approach 2.1.).

General Remarks
- 3.x or 2.x instead of 1.x TFTs per Pixel (for instance AM or analog shift register solution) are needed. But the TFTs can be much weaker (less current), so smaller TFTs are possible to implement more than 2 TFTs per pixel.
- A lot of local "wiring" is necessary leading to more layers and masks need for manufacturing.
- The larger the clusters, the more digital signals must be switched to program one value, limiting the cluster size.
- The large number of digital lines will create a high power dissipation, if the gate capacities and gate voltages are not reduced.

Direct Transfer Implementations

Address decoder variant, 2 TFT direct transfer. Reference is made to FIG. 29.

Multiplexer Structure, Direct Transfer

Because the analog signal must propagate through many TFTs, mixed variants of tree and address structure should reduce the number of transfer TFTs.

Solutions for Longer Transfer Times

0. General Direct Transfer Problems

If only one analog line per cluster is used, then programming times should be very short (25 MHz=40 ns). On the direct transfer variants the programming time equals the transfer(write)-time, high transfer currents through the TFTs are needed but maybe not possible because $R_{ON}$ is to high.

The following approaches will enable short programming times but long transfer times with low transistor currents.

1. Selected Multiple Transfers

If the transfer time is to short for some pixel only, this pixel can be written two or more times per frame.

2. 3-TFT Structures (Transfer Time>Programming Time)

Figure 30:
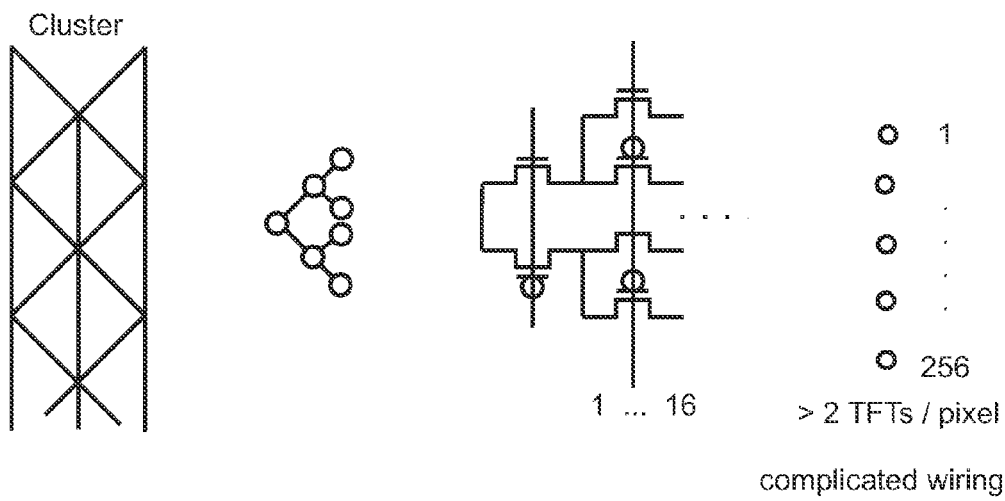
FIG. 30 shows an example of tree decoder structures for local wiring for an address decoder of a cluster.
Figure 32:
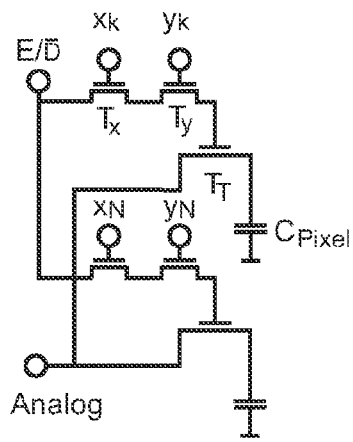
FIG. 32 shows in greater detail an example of the pixel circuits of two pixels being comparable to FIG. 7, wherein a pixel circuit for a pixel comprises 3 TFTs and wherein an analog line is present.

The following three "3-TFT" solutions use the same pixel structure and local matrix. Only the driving of the address-lines and the ENA-signal (Enable-signal) is different. Reference is made to FIGS. 30, 31 and 32.

2.1. Different Enable and Disable Operation on the Pixel "Address"

Function

To start the transfer, ENA is set to '1' and the two TFTs ($T_X$ and $T_Y$) are switched on by activating both row and column line of a dedicated/defined pixel. The charge transferred to the gate of $T_T$ switch the transfer TFT $T_T$ to "ON". The voltage of $C_{PIXEL}$ adapts to the voltage of the analog line. After the desired transfer time, ENA is set to '0' and the two TFTs ($T_X$ and $T_Y$) are switched on again by activating both row and column line of a dedicated pixel. The gate of $T_T$ is discharged an $T_T$ switch to "OFF". Programming operations (ON or OFF) to different pixel can be applied between start (enable) and stop (disable).

Advantages
  Different transfer times for each pixel are possible
  A very efficient charge recycling is possible because the timing of the enable operation that provide the old charge value can be independent from the disable operation that store the new value.

Remarks
  Enable and disable operation result in two times more transfers and halves the frame rate
  Additional TFT per pixel is needed (3.x instead of 2.x TFTs per pixel)

2.2. Cluster Disable Operation Before Ramp Value Change

Function

To start the transfer, ENA is set to '1' and the two TFTs ($T_X$ and $T_Y$) are switched on by activating both row and column lines of a dedicated pixel. The charge transferred to the gate of $T_T$ switch the transfer TFT $T_T$ "ON". The voltage of $C_{PIXEL}$ adapt to the voltage of the analog line. After all values of the same grey scale are written, all $T_T$ of the cluster are switched to OFF by one single operation. ENA is set to "0" and all row and column lines are set to "1" at the same time. Assuming 8-Bit resolution, a maximum of only $(2^N-1)=254$ disable operations is need.

Advantages
  Only one disable operation per bit value (more effective as the pixel disable method if the cluster size is larger than $2^8=256$ pixel).
  No enable-line needed, if special addr.-pattern like (all=1) is used to induct the discharge operation.

Remarks
  overhead increased with grey scale resolution in bit
  additional TFT per pixel is needed (3.x instead of 2.x TFTs per pixel)

2.3. Enable all Pixel TFTs at Start and Disable the Transfer TFTs while Ramp Up/Down Function At frame start, all transfer TFT $T_T$ are switched to "ON". The ENA is set to '1' and all row and column lines are set to "1" at the same time. This short circuits all pixel capacities and equalizes the pixel electrode voltages at frame start. All pixel voltages follow the ramp up of the analog voltage. If the desired voltage is reached, the pixel capacity is disconnected from the analog line by switching $T_T$ to OFF. To do this, ENA is set to '0' and the two TFTs ($T_X$ and $T_Y$) are switched on by activating both row and column line of a dedicated pixel.

Advantages
  No additional enable/disable operations and delays.
  No additional "start of frame"-line needed, if special addr.-pattern like (all=1) is used.
  Longest possible transfer times.

Remarks
  Only limited charge recycling is realized, because all charges are equalized at frame start.
  Because all pixel are enabled at start, the capacity that must be charged is increased.
  High equalize currents thru the TFTs during the "enable operation".

Additional Features
  Ramp up from then average voltage (sum of all old pixel values) to maximum and down to minimum or the over way round.

Changes Between Operations

To change between ENA='0' or '1' in section 2.1. or to activate the disable operation in section 2.2. or the enable operation in section 2.3., a special line can be used. To spare this line, a special address code or "magic word" can be used instead. If the operation is triggered, for instance at all addresses being "1", no pixel can use this address. To bypass this problem of the NULL-pixel, the following solutions can be used.

accept one dead (missing) pixel
    One clock NULL->operation, Two clocks NULL->pixel
    New cluster design (possibly better for holographic displays)

x=cluster 1 y=cluster 2 xxxxyyy
xxxyyyy
xxxxyyy
xxxyyyy
xxxxyyy
xxxyyyy

Disable 3-TFT variant: write into NULL pixel parallel to the disable operation and write to the NULL pixel at last, to change to the correct value.
    Enable 3-TFT variant: Enable all pixels at start, write the correct value to the "NULL"-Pixel immediately after start.

3. Thyristor or Reversible Breakthrough TFTs

Function

The 2-TFT structure with two thyristors or two special TFTs is used. If the pixel is activated and the $T_X$ and $T_Y$ TFTs are switched on, a high source-drain current flow through the two TFTs. This high current should induct a reversible breakthrough between source and drain to allow current to continue to flow, even if the gate voltages are disabled. If the voltages of the pixel capacity and the analog line are equal, the current go down to zero this should stop the breakthrough prohibiting further current flow if the analog line ramps up.

Advantages
    2 TFTs or one 2 gate thyristors only.
    long, self-regulated transfer times.

Additional Features
    The transfer time is not achieved thru breakthrough, but charge trapping in a dual layer multiple-gate structure.

Remarks
    defined discharge of the gate charges,
    If the TFTs are between ON and OFF for a log time, high power dissipation will occur.

4. Smaller Clusters and/or More Analog Data Lines

4.0. General Function

The programming time equals the transfer time, but smaller clusters allow longer programming times (=>transfer times). The number of digital lines is reduced, but the number of analog lines is increased.

4.1. Addresses are Transferred Bit Serial

Function

Figure 33:
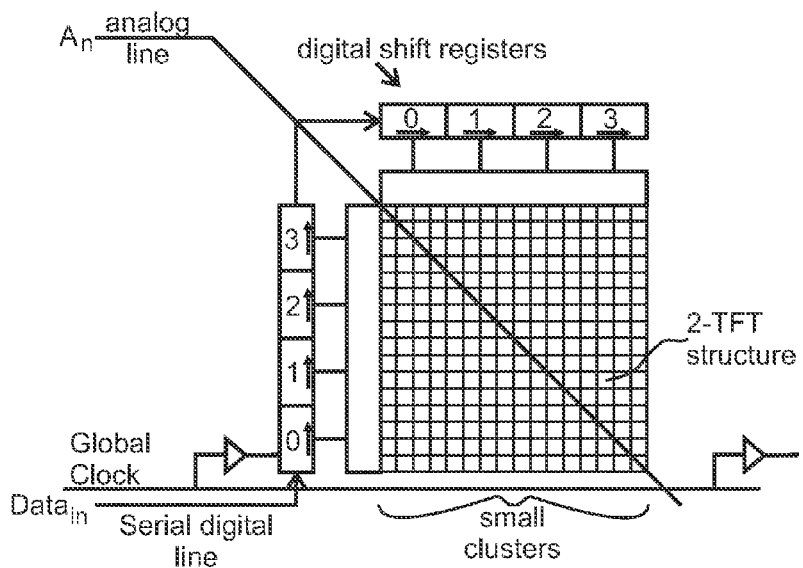
FIG. 33 shows an example of a cluster of pixels each comprising a 2 TFT pixel circuit and wherein an analog line is present to all pixels, wherein x-line addresses and y-line addresses are transferred bit serial on at least one line applying digital shift registers, FIGS. 34 and 35 each shows an example of two clusters of pixels each comprising a 2 TFT pixel circuit and wherein an analog line is present, wherein address lines are shared between multiple clusters, It is noted that the same or similar components shown in the Figures are referenced by the same reference numerals.

The row and column line addresses are transferred bit serial on one line (or very few lines), so smaller clusters, for instance 64×64 pixels, can be used. Reference is made to FIG. 33.

Advantages
    2 TFTs in matrix only.

Remarks
    Additional TFTs and clock network lines for digital shift registers.

4.2. Address Lines Shared Between Multiple Clusters

Function

Small clusters and one analog line per cluster are used. Row and column line addresses are shared between multiple clusters with an extra cluster enable signals that gates all row and column address lines. The signal can be gated on the input or on the output of the address-decoder.

Figure 34:
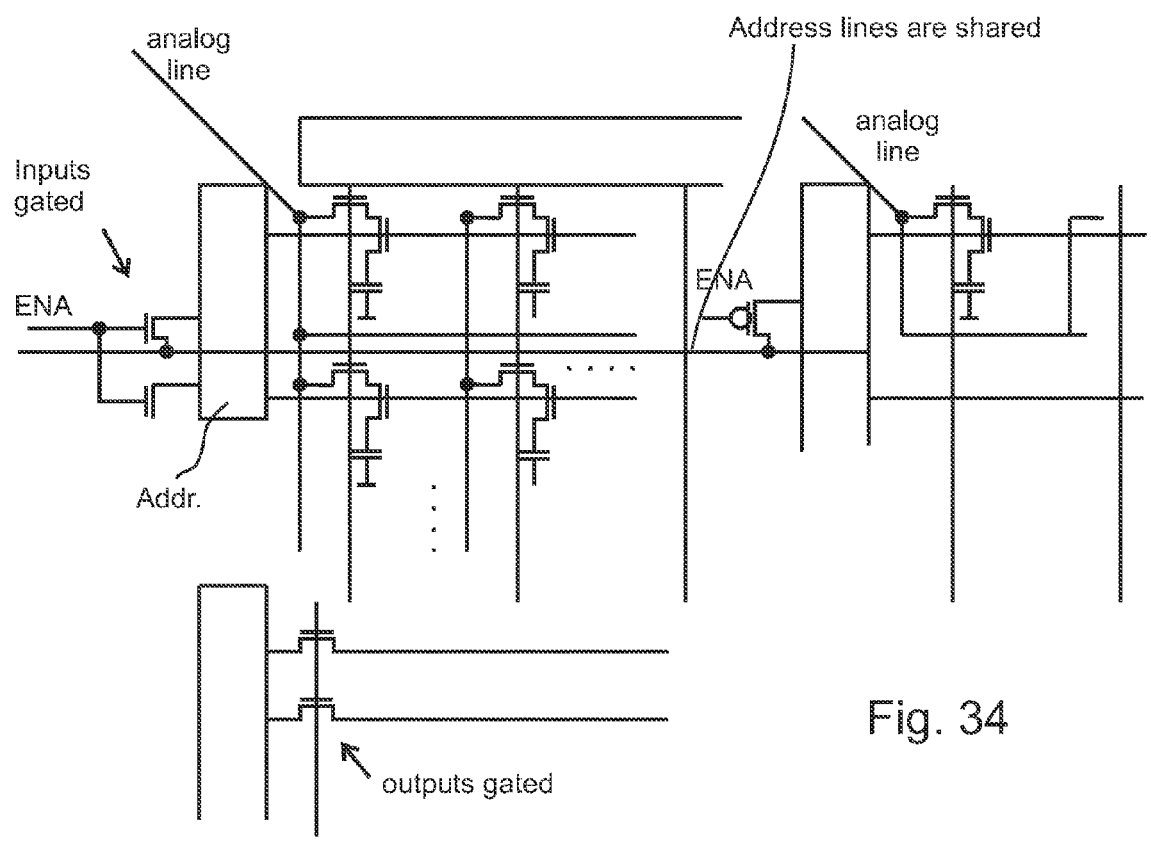
Figure 35:
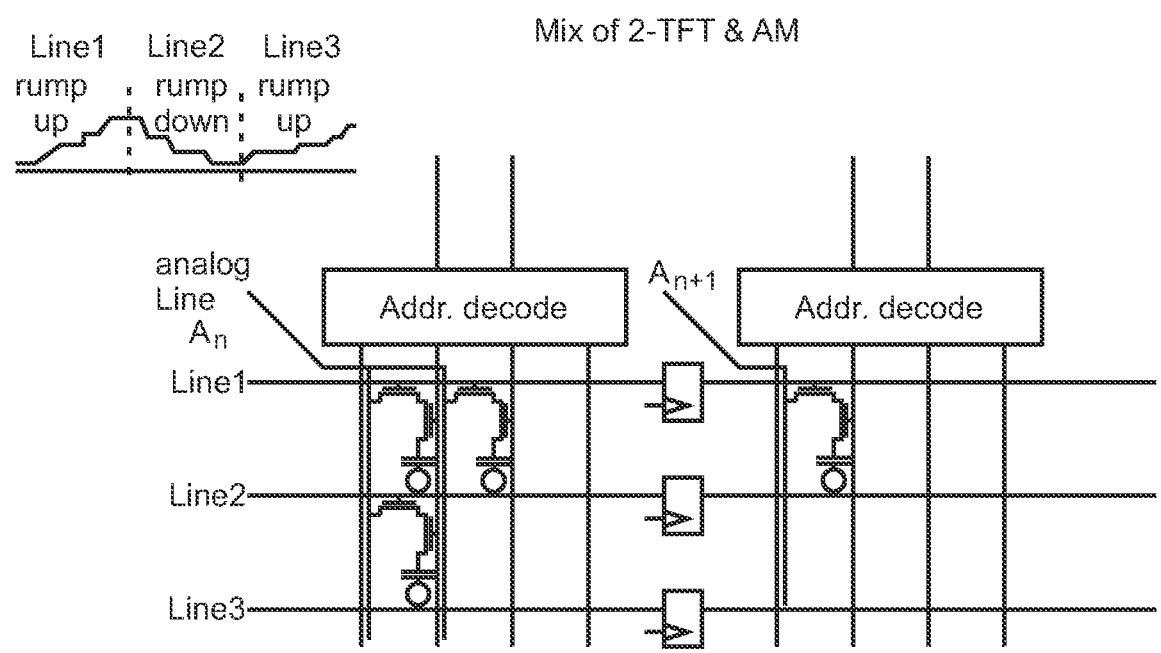

Advantages
    2 TFTs only.
    Reference is made to FIGS. 34 and 35.

5. Mix of 2-TFT Structure and AM (More then One Ramp Up)

Function

The circuit uses a mix between AM and the 2-TFT structure. For instance the row lines are normal AM gate lines and select one line for transfer. The column lines are controlled by address-decoders for sorted transfer. This approach uses on ramp up per row line.

Mix of Two or More Previous Versions

In general, it is possible to mix at least two or more of the embodiments mentioned above.

General Ideas for all Approaches
    Use multi gate TFTs to reduce the size of the ⅔ pixel TFTs.
    Use TFTs with top and bottom gate to reduce size.
    For very slow displays like E-paper, if only updated pixel are written, the complete display can comprise of only one cluster with one DAC. So one or very few discrete DAC-ICs and digital FPGA Outputs can be used to drive the display. So no mixed signal driver-ICs are needed.
    "Clever sorting": Clever sorting means to insert the pixel activation on a different time compared to normal value to achieve overdrive, charge recycling, error correction or minimize switching on the address lines (sort to minimize the total hamming distance of all transfers).
    More the one ramp or non-continuous rising or falling ramps are used to improve charge recycling.

Overlap

The switching time of the TFTs can be slower, because some overlap is possible, because the analog value is in constant change. A little ripple can be added, if more than one same value is written.

Other Related Ideas

Using the Integral Voltage

The transferred pixel voltage is not defined by the constant ramp voltage but the integral of the changing ramp voltage. The impact of $R_{ON}$ can be compensated by in system calibration. With integral transfer the "ramp up" times of the analog signal can also be used for transferring data, reducing the overhead for changing the analog values.

Using Only One Constant Analog Ramp Up Pattern Per Display (Slow Displays Only, Low Grey Scale Resolution Only)

Use only one static analog pattern for the whole display (only one analog line, one DAC). If the cluster consists of 64×64=4096 pixels, the analog signal outputs each grey scale value 4096 clock before changing to the next value. If 6 bit grey scale resolution is used, the addresses must be written at 4096 *2^6*60 fps=15 MHz.

If the grey scale values are nearly uniformly distributed, the times with constant analog values can be reduced, so this structure is also possible for faster displays.

To reduce the number of voltage stages, only a small basic bit-resolution like 4 bit is used. Higher resolution is applied be PWM using multiple writes in one or different frames.

| N | Cluster-Größe Pixel | x | y | MUX TFTs |
|---|---|---|---|---|
| 1 | 2 | 1 | 1 | 2 |
| 2 | 4 | 2 | 2 | 6 |
| 4 | 14 | 4 | 4 | 30 |
| 6 | 64 | 8 | 8 | 126 |

| N | Cluster-Größe Pixel | x | y | MUX TFTs |
|---|---|---|---|---|
| 8 | 256 | 16 | 16 | |
| 10 | 1024 | 32 | 32 | |
| 12 | 4096 | 64 | 64 | |
| 14 | 16384 | 128 | 128 | |
| 16 | 65536 | 256 | 256 | |

Normal LCD with Digital AM Structure and Only One Cluster and One DAC

The whole display comprises in this embodiment one cluster and use digital matrix structure and only on analog signal per cluster.

Backplane Design

A new backplane design based on LTPS has been developed aiming driving SLM with high frame rates used not only for holographic but in addition also for other stereo and 2D displays Power consumption is limited by applying charge recycling distributing charges across several pixel cells This invention is based on cluster design comprised of address decoders for controlling row and column lines and a pixel matrix with three TFTs per cell and a data line providing charges from the SLM edge All three TFTs of a pixel cell are digital controlled; two out of three in order to turn on/off a third TFT called Transfer TFT $T_T$ (see Fig.) so that charges can be transferred from the analogue line to addressed pixel capacities ($C_{Pixel}$)

Please refer to FIG. 6 above.

Several control modes are possible (see FIG. 6):

Terms:
$T_T$: Transfer TFT forwarding charges from the analogue line to a certain pixel capacitor $T_x$, $T_y$: TFTs switching on/off Transfer Transistor $T_T$ by an addressable manner Analogue line (red highlighted in both drawing): provides the voltages to charge up pixel capacities ENA (E/D) line: This line controls the state of the charge applied to $T_T$'s Gate capacity;
if activated charges will be transferred to $T_T$'s gate; otherwise charges moves in the opposite direction away from the Gate of $T_T$ First Approach
TFTs ($T_x$, $T_y$) of pixels assigned to a certain voltage value are subsequently turned on with activated ENA signal for writing the voltage
results in activating Transfer Transistor $T_T$, because its Gate capacity is charged up;
Pixel capacity is charged up in accordance to the applied voltage on the analogue data line
And then it is switched off with deactivated ENA signal to preserve the charge when new and different voltages (intended for other pixels cells) will be provided by the analogue data line
The charge on the Transfer Transistor's $T_T$ Gate capacity is disposed over the ENA line;
Because the Transfer Transistor $T_T$ is off the pixel capacity is no longer affected by the voltage applied to the analogue line Results:
This control regime facilitates efficient charge recycling reducing power consumption because timing for charge equalisation can be controlled by ENA signal line
Transfer time can be controlled for each pixel Second Approach
Procedure charging pixel cells with the same voltage value is the same like described in First approach
Measure to preserve the charge in each pixel capacity is different compared to the first one:
When all pixels requiring the same voltage are subsequently charged up all address lines and the ENA line are activated
Gate capacities of all Transfer Transistors $T_T$ are discharged turning off $T_T$ so that the charge and in accordance the pixel voltage remains
Then the voltage can be increased further and pixels requiring higher voltages will be addressed in the same manner described above Results:
Less disable cycles (depends on the number of grey/phase values only) needed increasing frame rate compared to the first one Third Approach
This type of control regime is different to the aforementioned two ones
At the start all address lines and the ENA signal line are activated leading to all pixel cells will be provided by the same voltage value.
Leads to charging up the Gate capacity of the Transfer Transistor $T_T$ resulting to a minimise R(on); R(on): Channel resistance
Transfer Transistor $T_T$ is on
Then all address lines and the ENA line are deactivated due to preserve the charge on the $T_T$'s Gate keeping it on
By increasing the analogue data line all pixels capacities will be accordingly charged; This lasts as long as address lines of certain pixel are not activated
When the address line of a certain pixel is activated then the charge of Transfer Transistors $T_T$ Gate capacity is discharged over the ENA line resulting to turn off the Transfer transistor $T_T$
This operation makes sure that pixels with activated address lines will not be affected by further increasing of voltage but all the other non-activated pixels will be applied by new voltage values Results:
No additional Enable/Disable operations and delays

The invention claimed is:

1. Backplane device for a spatial light modulator or for a spatial light modulator in a display device for generating a two-dimensional or three-dimensional representation of a scene or of content, the spatial light modulator comprising pixels having pixel addresses and being electronically controllable by the backplane device for assigning pixel values to the pixels, the backplane device comprising at least one electrode for each pixel, at least one analog line and at least one pixel addressing means, wherein such a pixel addressing means comprises x-addressing lines and y-addressing lines, wherein every pixel is connected to an analog line, to an x-addressing line and to a y-addressing line, wherein as a pixel value assigning scheme a generating means is adapted to generate a voltage characteristic to be applied to the at least one analog line such that the voltage characteristic depends on the pixel values to be assigned to the pixels, wherein the backplane device is adapted such that the pixel addresses are determined depending on the generated voltage characteristic as a pixel addressing scheme and such that the generated voltage characteristic is applied to the at least one analog line for the purpose of assigning the pixels value to the pixels.

2. Backplane device according to claim 1, wherein the voltage characteristic is at least one of the following: a voltage ramp up function and a voltage ramp down function and a saw-tooth like function; or wherein the voltage characteristic comprises an overdrive value for a predetermined period of time or wherein the voltage characteristic comprises an underdrive value for a predetermined period of time.

3. Backplane device according to claim 1, wherein the voltage characteristic is variable in time and has predominantly the characteristic of a mathematically monotonic function, especially monotonic increasing or monotonic decreasing.

4. Backplane device according to claim 1, wherein the generated voltage characteristic being applied to the at least one analog line determines the order of addressing of the pixels.

5. Backplane device according to claim 1, wherein the pixel addresses being determined are generated for the x-direction and for the y-direction and wherein the assignment of a pixel value to a pixel is carried out in a random access manner with respect to the x-direction and to the y-direction.

6. Backplane device according to claim 1, wherein the addressing of all pixels to which the same pixel value is assigned is performed in temporal proximity to each other in one operation mode of the backplane device or wherein in another operation mode of the backplane device at essentially the same time or wherein in still another operation mode of the backplane device in a period of time or wherein at a time a pixel value is assigned to only one pixel.

7. Backplane device according to claim 1, wherein the spatial light modulator or the backplane device comprises a cluster arrangement of at least two clusters of pixels and wherein each cluster comprises an analog line and a pixel addressing means for addressing the pixels of the cluster.

8. Backplane device according to claim 7, wherein the clusters are controlled independently from each other or wherein a plurality of pixels forming a connected or a contiguous region of the spatial light modulator form a cluster, wherein such a region comprises at least one of the following: a rectangular shape and a square shape and a honeycomb shape; and wherein a cluster preferably does not extend over a full width or a full length of the spatial light modulator.

9. Backplane device according to claim 1, wherein a control circuit for a pixel comprises two thin film transistors (TFTs), wherein the first TFT is connected to the analog line, to an x-addressing line and to the second TFT, wherein the second TFT is connected to the first TFT, to a y-addressing line and to the electrode of the pixel.

10. Backplane device according to claim 9, wherein the first TFT of a pixel and the second TFT of the same pixel are combined into a dual gate TFT.

11. Backplane device according to claim 9, wherein an x-addressing line or a y-addressing line is connected with the gate of the first TFT of a pixel or with the gate of the second TFT of the pixel or with the gates of the dual gate TFT according to claim 10.

12. Backplane device according to claim 9, wherein an enable line or the x-addressing line serving as an enable line is connected with the source of the first TFT of a pixel and/or wherein the drain of the first TFT of a pixel is connected to the source of the second TFT of the same pixel.

13. Backplane device according to claim 9, wherein the analog line is connected to the source of the third TFT of a pixel and the electrode of the same pixel is connected with the drain of the third TFT of the same pixel and/or wherein the drain of the second TFT of a pixel is connected to the gate of the third TFT of the same pixel.

14. Backplane device according to claim 1, wherein a control circuit for a pixel comprises two TFTs, wherein the first TFT is connected to an x-addressing line, to a y-addressing line and to the second TFT and wherein the second TFT is connected to the first TFT, to the analog line and to the electrode of the pixel.

15. Backplane device according to claim 1, comprising at least one enable line, every pixel being connected to an enable line.

16. Backplane device according to claim 15, wherein a control circuit for a pixel comprises three TFTs, wherein the first TFT is connected to the enable line, to an x-addressing line and to the second TFT, wherein the second TFT is connected to the first TFT, to a y-addressing line and to the third TFT and wherein the third TFT is connected to the second TFT, to the analog line and to the electrode of the pixel.

17. Backplane device according to claim 1, wherein a control circuit for a pixel comprises three TFTs, wherein for two pixels being located adjacent to each other and being addressed by the same y-addressing line, the first TFT of the first pixel is—as an enabling function—connected to the x-addressing line of the second pixel, to the y-addressing line and to the second TFT of the first pixel, wherein the second TFT of the first pixel is connected to the first TFT of the first pixel, to an x-addressing line of the first pixel and to the third TFT of the first pixel, wherein the third TFT of the first pixel is connected to the second TFT of the first pixel, to the analog line and to the electrode of the first pixel, wherein the first TFT of the second pixel is—as an enabling function—connected to the x-addressing line of the first pixel, to the y-addressing line and to the second TFT of the second pixel, wherein the second TFT of the second pixel is connected to the first TFT of the second pixel, to an x-addressing line of the second pixel and to the third TFT of the second pixel and wherein the third TFT of the second pixel is connected to the second TFT of the second pixel, to the analog line and to the electrode of the second pixel.

18. Backplane device according to claim 17, wherein the logic level of the enable line corresponds to the logic level of the x-addressing lines.

19. Backplane device according to claim 1, wherein a control circuit for a pixel comprises three TFTs, wherein for four pixels being located adjacent to each other and being addressed by the same y-addressing line, wherein the first TFT of the first pixel is—as an enabling function—connected to the x-addressing line of the third pixel, to the y-addressing line and to the second TFT of the first pixel, wherein the second TFT of the first pixel is connected to the first TFT of the first pixel, to an x-addressing line of the first pixel and to the third TFT of the first pixel, wherein the third TFT of the first pixel is connected to the second TFT of the first pixel, to the analog line and to the electrode of the first pixel, wherein the first TFT of the second pixel is—as an enabling function—connected to the x-addressing line of the first pixel, to the y-addressing line and to the second TFT of the second pixel, wherein the second TFT of the second pixel is connected to the first TFT of the second pixel, to an x-addressing line of the second pixel and to the third TFT of the second pixel, wherein the third TFT of the second pixel is connected to the second TFT of the second pixel, to the analog line and to the electrode of the second pixel, wherein the first TFT of the third pixel is—as an enabling function—connected to the x-addressing line of the fourth pixel, to the y-addressing line and to the second TFT of the third pixel, wherein the second TFT of the third pixel is connected to the first TFT of the third pixel, to an x-addressing line of the third pixel and to the third TFT of the third pixel, wherein the third TFT of the third pixel is connected to the second TFT of the third pixel, to the analog line and to the electrode of the third pixel, wherein the first TFT of the fourth pixel is—as an enabling function—connected to the x-addressing line of the second pixel, to the y-addressing line and to the second TFT of the fourth pixel, wherein the second TFT of the fourth pixel is connected to the first TFT of the fourth pixel, to an x-addressing line of the fourth pixel and to the third TFT of the fourth pixel, wherein the third TFT of the fourth pixel is connected to the second TFT of the fourth pixel, to the analog line and to the electrode of the fourth pixel.

20. Backplane device according to claim 1, wherein the pixel addressing means comprises at least one x-address decoder and at least one y-address decoder, the x-address decoder being connected to the x-addressing lines and the y-address decoder being connected to the y-addressing lines.

21. Backplane device according to claim 20, wherein the x-address decoder and/or the y-address decoder is based on at least one of the following: a Dynamic NOR-decoder; and a Dynamic AND-decoder; and an OR-decoder; and a CMOS-Decoder comprising a NAND and NOR circuit; and an AND-decoder.

22. Backplane device according to claim 20, wherein the x-address decoder or the y-address decoder is arranged separately from the backplane device or wherein the x-address decoder or the y-address decoder is located at the outside edge of the backplane device or wherein the x-address decoder or the y-address decoder is located on the backplane device between the pixels.

23. Backplane device according to claim 1, wherein each pixel comprises a pixel control structure, wherein the pixel control structures being arranged in a regular layout, where all pixel control structures preferably are oriented in the same way, or wherein the pixel control structures of two neighbouring pixels are arranged mirrored to each other or wherein the pixel control structures of four neighbouring pixels are arranged mirrored to each other.

24. Backplane device according to claim 1, wherein the spatial light modulator is adapted to deflect light interacting with the spatial light modulator on the basis of diffraction or wherein the spatial light modulator is realized according to claim 1 of WO 2010/149587.

25. Spatial light modulator or spatial light modulator for a display device for generating a two-dimensional or three-dimensional representation of a scene or of content, comprising a backplane device according to claim 1.

26. Display device for generating a two-dimensional or three-dimensional representation of a scene or a stereoscopic or holographic display device, comprising a backplane device according to claim 1 or comprising the spatial light modulator according to claim 25.

27. Method for operating a backplane device for a spatial light modulator, or for operating the backplane device according to claim 1, the spatial light modulator comprising pixels having pixel addresses and being electronically controlled by the backplane device for assigning pixel values to the pixels, wherein the backplane device comprising at least one electrode for each pixel, at least one analog line and at least one pixel addressing means, wherein such a pixel addressing means comprises x-addressing lines and y-addressing lines, wherein every pixel is connected to an analog line, to an x-addressing line and to a y-addressing line, the method comprising the steps of:
as a pixel value assigning scheme a generating means generates a voltage characteristic to be applied to the at least one analog line such that the voltage characteristic depends on the pixel values to be assigned to the pixels,
the pixels addresses are determined depending on the generated voltage characteristic as a pixel addressing scheme and
the generated voltage characteristic is applied to the at least one analog line for the purpose of assigning the pixel values to the pixels.

28. Method according to claim 27, wherein for assigning a pixel value to a pixel, the x-addressing line and the y-addressing line for this pixel are selected and the enable line being connected to this pixel is activated, resulting in a charge transfer from the analog line to the electrode of the pixel, wherein the x-addressing line and the y-addressing line are deselected and/or the enable line being connected to this pixel is deactivated for maintaining the charge transferred at the electrode of this pixel.

29. Method according to claim 26, wherein for assigning the same pixel value to a plurality of pixels, for each of these pixels, the enable line being connected to such a pixel is activated and the x-addressing line and the y-addressing line are subsequently selected, resulting in a subsequent charge transfer from the analog line to the electrode of each subsequently activated pixel, wherein the x-addressing line, the y-addressing line and the enable line for these pixels are deactivated for maintaining the charge transferred at the electrodes of these pixels.

30. Method according to claim 26, wherein for a plurality of selected pixels, the x-addressing lines and the y-addressing lines are selected and addressing lines having an enabling function for these pixels are activated or the enable line being connected to these pixels is activated for setting the electrodes of all these pixels to a same voltage as provided via the analog line or for short circuiting all electrodes of the selected pixels, wherein the x-addressing lines and the y-addressing lines are deselected, wherein for assigning a pixel value to a pixel, the x-addressing line and the y-addressing line for this pixel are selected, resulting in a charge transfer from the analog line to the electrode of the pixel, wherein the x-addressing line and the y-addressing line are deselected and wherein the enable line being connected to these pixels is deactivated for maintaining the charge of the electrodes of these pixels.

* * * * *